US012229721B2

(12) United States Patent
Albright

(10) Patent No.: US 12,229,721 B2
(45) Date of Patent: Feb. 18, 2025

(54) SYSTEMS AND METHODS FOR AUTOMATICALLY GENERATING AND TRANSMITTING A DIGITAL COMPONENTS ACQUISITION REQUEST

(71) Applicant: Sub-Assist, LLC, Greenwood Village, CO (US)

(72) Inventor: John Albright, Greenwood Village, CO (US)

(73) Assignee: Sub-Assist, LLC., Greenwood Village, CO (US)

( * ) Notice: Subject to any disclaimer, the term of this patent is extended or adjusted under 35 U.S.C. 154(b) by 0 days.

(21) Appl. No.: 18/423,971

(22) Filed: Jan. 26, 2024

(65) Prior Publication Data

US 2024/0265346 A1    Aug. 8, 2024

Related U.S. Application Data

(60) Provisional application No. 63/451,206, filed on Mar. 9, 2023, provisional application No. 63/443,803, filed on Feb. 7, 2023.

(51) Int. Cl.
*G06Q 10/0875* (2023.01)
*G06Q 30/0601* (2023.01)
*G06Q 50/08* (2012.01)
*G06V 30/10* (2022.01)

(52) U.S. Cl.
CPC ..... *G06Q 10/0875* (2013.01); *G06Q 30/0637* (2013.01); *G06Q 50/08* (2013.01); *G06V 30/10* (2022.01)

(58) Field of Classification Search
CPC .......... G06Q 10/0875; G06Q 30/0637; G06Q 50/08; G06V 30/10
USPC ........................................................ 705/29
See application file for complete search history.

(56) References Cited

U.S. PATENT DOCUMENTS 8,752,002 B2 *   6/2014  Banavar ........... G06Q 10/06393
                                                       717/104
2023/0306481 A1 *  9/2023  Vasileiadis ............. G06Q 30/02

* cited by examiner

*Primary Examiner* — Garcia Ade
(74) *Attorney, Agent, or Firm* — Padowithz Alce; Quintin Scheitlin; Alce PLLC

(57) ABSTRACT

A system and method for automatically generating and transmitting a digital components acquisition request includes obtaining a digital sourcing requisition that includes a digital itemization of a plurality of physical components required for completing a plurality of real-world tasks; retrieving, from a governing artifacts database, a governing digital artifact record based on a plurality of key-value attribute pairs selectively extracted from the digital sourcing requisition; assessing the digital itemization of the plurality of physical components of the digital sourcing requisition against a plurality of multi-attribute data tuples associated with the governing digital artifact record; automatically generating a digital components acquisition request based on one or more assemblies of items transitively associated with pairwise matches generated during the assessing; and automatically transmitting the digital components acquisition request for physically sourcing items from a remote source of items.

20 Claims, 10 Drawing Sheets

SYSTEMS AND METHODS FOR AUTOMATICALLY GENERATING AND TRANSMITTING A DIGITAL COMPONENTS ACQUISITION REQUEST

CROSS-REFERENCE TO RELATED APPLICATIONS

This application claims the benefit of U.S. Provisional Application No. 63/451,206, filed 9 Mar. 2023, and U.S. Provisional Application No. 63/443,803, filed 7 Feb. 2023, which are incorporated herein in their entirety by this reference.

TECHNICAL FIELD

This invention relates generally to the computerized ordering field, and more specifically, to a new and useful system and method for automatically generating and transmitting a digital components acquisition request.

BACKGROUND

An external entity (e.g., homebuilder) typically engages a subcontractor to perform one or more construction-related projects. During the course of the engagement, the external entity typically issues, to the subcontractor, a contract specifying terms and conditions of the one or more construction-related projects and a purchase order defining a request to order the one or more construction-related projects from the subcontractor. Typically, these one or more construction-related projects require a voluminous number of materials, and thus, one of the initial steps to fulfilling the one or more construction-related projects is the procurement of such materials.

Determining the materials or supplies needed for the one or more constructed-related projects typically relies on expert knowledge of the subcontractor. Relying on expert knowledge is not only burdensome, error-prone, and expensive, but also fails to scale in instances where the subcontractor engages in a significant number of constructed-related projects. Thus, there is a need for new and useful systems and methods for automatically generating and transmitting a digital components acquisition request. The embodiments of the present application described herein provide technical solutions that address, at least, the needs described above.

BRIEF SUMMARY OF THE INVENTION(S)

In some embodiments, a computer-implemented method for automatically generating and transmitting a digital components acquisition request includes obtaining a digital sourcing requisition that includes a digital itemization of a plurality of physical components required for completing a plurality of real-world tasks; retrieving, from a governing artifacts database, a governing digital artifact record based on a plurality of key-value attribute pairs selectively extracted from the digital sourcing requisition; assessing, by one or more computer processors, the digital itemization of the plurality of physical components of the digital sourcing requisition against a plurality of multi-attribute data tuples associated with the governing digital artifact record, wherein assessing the digital itemization of the plurality of physical components includes: performing a pairwise assessment between each physical component in the digital itemization and each of the plurality of multi-attribute data tuples associated with the governing digital artifact record, and when the pairwise assessment between a respective physical component of the plurality of physical components and a respective multi-attribute data tuple of the plurality of multi-attribute data tuples results in at least a semantic match, displaying the semantic match between the respective physical component and the respective multi-attribute data tuple in a graphical user interface for user verification and approval; automatically generating, by the one or more computer processors, a digital components acquisition request based on a plurality of pairwise assessment matches produced during the assessing, wherein generating the digital components acquisition request includes: identifying one or more assemblies of items based on the plurality of pairwise assessment matches, and programmatically installing, into the digital components acquisition request, items and associated quantities defined in each of the one or more assemblies of items; and automatically transmitting, over a computer network, the digital components acquisition request to a target external entity for physically sourcing the items delineated in the digital components acquisition request.

In some embodiments, the governing artifacts database includes a plurality of governing digital artifact records, and retrieving the governing digital artifact record from the governing artifacts database includes executing a set of computer-implemented artifact matching instructions that automatically match the digital sourcing requisition to a corresponding governing digital artifact record of the plurality of governing digital artifact records by identifying one or more date-related key-value attribute pairs and a project code key-value attribute pair from the digital sourcing requisition, searching the governing artifacts database for one or more candidate governing digital artifact records that correspond to a value of the project code key-value attribute pair, and selecting one of the one or more candidate governing digital artifact records returned from the searching as the corresponding governing digital artifact record based on a value of the one or more date-related key-value attribute pairs.

In some embodiments, the governing digital artifact record retrieved from the governing artifacts database relates to a target governing artifact, and establishes an association between the target governing artifact and the plurality of multi-attribute data tuples associated with the target governing artifact; and a respective multi-attribute data tuple of the plurality of multi-attribute data tuples includes an item assemblies attribute field that is configured to store one or more assemblies of items associated with the respective multi-attribute data tuple.

In some embodiments, performing the pairwise assessment between a respective physical component in the digital itemization and each multi-attribute data tuple of the governing digital artifact includes employing a heuristic comparison algorithm that evaluates semantic and syntactic data fields of the respective physical component against corresponding attributes in each multi-attribute data tuple of the governing digital artifact; calculating a match score for each candidate pairing between the respective physical component and the plurality of multi-attribute data tuples associated with the governing digital artifact, wherein the match score computed for a candidate pairing between the respective physical component and a first multi-attribute data tuple is highest among all possible candidate pairings; and selecting the first multi-attribute data tuple as a likely match to the respective physical component.

In some embodiments, the one or more assemblies of items are stored in an item assembly database, the item assembly database relates to a digital storage system designed to store a plurality of assemblies of items, and a respective assembly of items of the plurality of assemblies of items corresponds to a respective multi-attribute data tuple and defines a collection of inter-related items required for a real-world task associated with the respective multi-attribute data tuple.

In some embodiments, generating the digital components acquisition request further includes the identifying of the one or more assemblies of items based on the plurality of pairwise assessment matches, obtaining the items and associated quantities defined in each of the one or more assemblies of items, and calculating a net quantity for each of the items obtained by subtracting, from the net quantity for a respective item, negative item quantity values associated with the respective item across the one or more assemblies of items, and adding, to the net quantity for the respective item, positive item quantity values associated with the respective item across the one or more assemblies of items, and the programmatically installing, into the digital components acquisition request, of the items and the associated quantities, wherein programmatically installing the associated quantities includes installing the net quantity calculated for each of the items into the digital components acquisition request.

In some embodiments, the plurality of pairwise assessment matches are associated with a plurality of assemblies of items, and identifying the one or more assemblies of items based on the plurality of pairwise assessment matches includes applying a plurality of computer-implemented item assembly rules to determine an inclusion or exclusion of each of the plurality of assemblies of items, and aggregating materials and requisite quantities delineated in one or more of the plurality of assemblies of items associated with the plurality of pairwise assessment matches based on an inclusion or exclusion outcome produced by the plurality of computer-implemented item assembly rules.

In some embodiments, the digital components acquisition request relates to an application programming interface (API) request, and programmatically installing the items and associated quantities into the digital components acquisition request includes defining a target endpoint for the API request based on electronic communication preferences of the target external entity, and defining a payload of the API request based on the items and the associated quantities defined in the one or more assemblies of items, wherein defining the payload includes formatting the payload in accordance with the electronic communication preferences of the target external entity.

In some embodiments, the digital components acquisition request relates to an electronic communication message, and programmatically installing the items and associated quantities into the digital components acquisition request includes instantiating a tabular data structure, adding a plurality of rows to the tabular data structure that correspond to the items and associated quantities delineated in the one or more assemblies of items, and embedding the tabular data structure in the digital components acquisition request.

In some embodiments, the digital sourcing requisition is derived from a copy of an unstructured physical artifact, and obtaining the digital sourcing requisition includes receiving, via a graphical user interface, a copy of the unstructured physical artifact, extracting, via one or more optical character recognition (OCR) processes, a corpus of sourcing requisition feature data from the copy of the unstructured physical artifact, and installing the corpus of sourcing requisition feature data into a structured digital sourcing requisition data structure compatible with a system or service implementing the computer-implemented method.

In some embodiments, obtaining the digital sourcing requisition includes downloading the digital sourcing requisition from an external software system via an application programming interface (API), normalizing data fields of the digital sourcing requisition downloaded from the external software system to conform to a standardized data format used by a system or service implementing the computer-implemented method, and generating a digital sourcing requisition data structure compatible with the system or service implementing the computer-implemented method based on the normalizing of the data fields.

In some embodiments, the governing digital artifact record relates to a governing electronic artifact that defines operational attributes and parameters of the plurality of real-world tasks, a respective multi-attribute data tuple of the plurality of multi-attribute data tuples associated with the governing digital artifact record relates to a distinct real-world task of the plurality of real-world tasks, and a respective assembly of items of the one or more assemblies of items includes a list of items required for the distinct real-world task, and requisite quantities for each item of the list of items.

In some embodiments, a computer-program product embodied in a non-transitory machine-readable storage medium storing computer instructions that, when executed by one or more processors, perform operations comprising obtaining a digital sourcing requisition that includes a digital itemization of a plurality of physical components required for completing a plurality of real-world tasks; retrieving, from a governing artifacts database, a governing digital artifact record based on a plurality of key-value attribute pairs selectively extracted from the digital sourcing requisition; assessing, by one or more computer processors, the digital itemization of the plurality of physical components of the digital sourcing requisition against a plurality of multi-attribute data tuples associated with the governing digital artifact record, wherein assessing the digital itemization of the plurality of physical components includes performing a pairwise assessment between each physical component in the digital itemization and each of the plurality of multi-attribute data tuples associated with the governing digital artifact record, and when the pairwise assessment between a respective physical component of the plurality of physical components and a respective multi-attribute data tuple of the plurality of multi-attribute data tuples results in at least a semantic match, displaying the semantic match between the respective physical component and the respective multi-attribute data tuple in a graphical user interface for user verification and approval; automatically generating, by the one or more computer processors, a digital components acquisition request based on a plurality of pairwise assessment matches produced during the assessing, wherein generating the digital components acquisition request includes identifying one or more assemblies of items based on the plurality of pairwise assessment matches, and programmatically installing, into the digital components acquisition request, items and associated quantities defined in each of the one or more assemblies of items; and automatically transmitting, over a computer network, the digital components acquisition request to a target external entity for physically sourcing the items delineated in the digital components acquisition request.

In some embodiments, the governing artifacts database includes a plurality of governing digital artifact records, and retrieving the governing digital artifact record from the governing artifacts database includes executing a set of computer-implemented artifact matching instructions that automatically match the digital sourcing requisition to a corresponding governing digital artifact record of the plurality of governing digital artifact records by identifying a job start date key-value attribute pair and a project code key-value attribute pair from the digital sourcing requisition, searching the governing artifacts database for one or more candidate governing digital artifact records that correspond to a value of the project code key-value attribute pair, and selecting one of the one or more candidate governing digital artifact records returned from the searching as the corresponding governing digital artifact record based on a value of the job start date key-value attribute pair.

In some embodiments, performing the pairwise assessment between a respective physical component in the digital itemization and each multi-attribute data tuple of the governing digital artifact includes employing a heuristic comparison algorithm that evaluates semantic and syntactic data fields of the respective physical component against corresponding attributes in each multi-attribute data tuple of the governing digital artifact; calculating a match score for each candidate pairing between the respective physical component and the plurality of multi-attribute data tuples associated with the governing digital artifact, wherein the match score computed for a candidate pairing between the respective physical component and a first multi-attribute data tuple is highest among all possible candidate pairings; and selecting the first multi-attribute data tuple as a likely match to the respective physical component.

In some embodiments, generating the digital components acquisition request further includes the identifying of the one or more assemblies of items based on the plurality of pairwise assessment matches, obtaining the items and associated quantities defined in each of the one or more assemblies of items, and calculating a net quantity for each of the items obtained by subtracting, from the net quantity for a respective item, negative item quantity values associated with the respective item across the one or more assemblies of items, and adding, to the net quantity for the respective item, positive item quantity values associated with the respective item across the one or more assemblies of items, and the programmatically installing, into the digital components acquisition request, of the items and the associated quantities, wherein programmatically installing the associated quantities includes installing the net quantity calculated for each of the items into the digital components acquisition request.

In some embodiments, the plurality of pairwise assessment matches are associated with a plurality of assemblies of items, and identifying the one or more assemblies of items based on the plurality of pairwise assessment matches includes applying a plurality of computer-implemented item assembly rules to determine an inclusion or exclusion of each of the plurality of assemblies of items, and aggregating materials and requisite quantities delineated in one or more of the plurality of assemblies of items associated with the plurality of pairwise assessment matches based on an inclusion or exclusion outcome produced by the plurality of computer-implemented item assembly rules.

In some embodiments, the digital sourcing requisition is derived from an unstructured physical artifact, and obtaining the digital sourcing requisition includes receiving, via a graphical user interface, a user-uploaded copy of the unstructured physical artifact, extracting, via one or more optical character recognition (OCR) processes, a corpus of sourcing requisition feature data from the user-uploaded copy of the unstructured physical artifact, and installing the corpus of sourcing requisition feature data into a structured digital sourcing requisition data structure compatible with a system or service implementing the computer-program product.

In some embodiments, obtaining the digital sourcing requisition includes downloading the digital sourcing requisition from an external software system via an application programming interface (API), normalizing data fields of the digital sourcing requisition downloaded from the external software system to conform to a standardized data format used by a system or service implementing the computer-implemented method, and generating a digital sourcing requisition data structure compatible with the system or service implementing the computer-program product based on the normalizing of the data fields.

In some embodiments, a computer-implemented method for automatically generating and transmitting a digital components acquisition request includes obtaining a digital sourcing requisition that includes a digital itemization of a plurality of physical components required for completing a plurality of real-world tasks; retrieving, from a governing artifacts database, a governing digital artifact record based on a plurality of key-value attribute pairs selectively extracted from the digital sourcing requisition; assessing, by one or more computer processors, the digital itemization of the plurality of physical components of the digital sourcing requisition against a plurality of multi-attribute data tuples associated with the governing digital artifact record; automatically generating a digital components acquisition request based on one or more assemblies of items transitively associated with pairwise matches generated during the assessing; and automatically transmitting, over a computer network, the digital components acquisition request for physically sourcing items from a remote source of items.

BRIEF DESCRIPTION OF THE FIGURES

FIGS. 6-10 illustrates example graphical user interfaces in accordance with one or more embodiments of the present application.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

1.00 Digital Ordering and Reconciliation Platform

Figure 1:
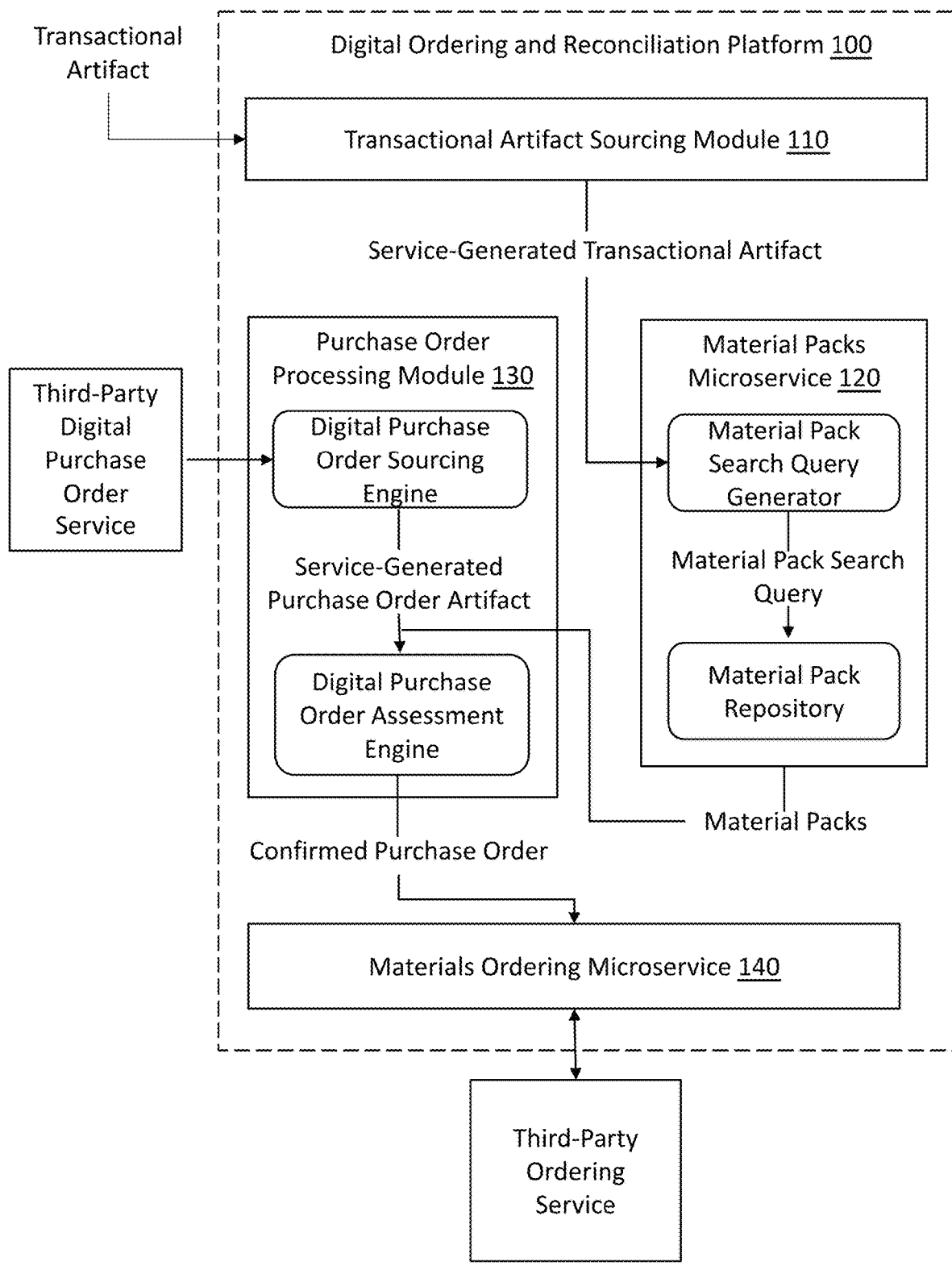
FIG. 1 illustrates a schematic representation of a system 100 in accordance with one or more embodiments of the present application.

As shown in FIG. 1, a digital ordering and reconciliation platform 100 may include a transactional artifact sourcing module 110, a material packs microservice 120, a purchase order processing module 130, and a materials ordering microservice 140.

1.10 Transactional Artifact Sourcing Module

The transactional artifact sourcing module 110 may function to source or obtain one or more transactional artifacts associated with a subscriber. In some embodiments, the transactional artifact sourcing module 110 may implement one or more graphical user interfaces (GUIs), command line interfaces (CLIs), or application programming interfaces (APIs) to obtain or source the one or more transactional artifacts associated with the subscriber. The one or more graphical user interfaces (GUIs), command line interfaces (CLIs), or application programming interfaces (APIs), in such embodiments, may be digitally accessible by the subscriber(s) of the system 100 and/or may enable the subscriber(s) to upload or transmit one or more target transactional artifacts to the system 100.

In some embodiments, a transactional artifact, as generally referred to herein, may be or relate to a contractual artifact between the subscriber and one or more external entities for performing one or more construction-related tasks (e.g., real-world tasks). For instance, in a non-limiting example, the one or more transactional artifacts sourced by the transactional artifact sourcing module 110 may each relate to a distinct contractual agreement that engages the subscriber (e.g., subcontractor) to perform one or more construction-related tasks for an external entity (e.g., homebuilder, general contractor, homeowner, business owner, and/or the like).

1.20 Material Packs Microservice

The material packs microservice 120 may function to derive one or more digital material packs associated with each transactional artifact sourced by the transactional artifact sourcing module 110. A digital material pack, as generally referred to herein, may relate or correspond to a distinct construction-related task and, optionally, may comprise a collection of one or more (e.g., interdependent) materials for performing the distinct construction-related task or project. Thus, in some embodiments, deriving the one or more digital material packs associated with a subject transactional artifact may enable the system 100 to automatically recognize or discern the one or more materials required for fulfilling the one or more constructed-related tasks defined in the subject transactional artifact.

As described in more detail herein, in one implementation, to derive the one or more digital material packs associated with a target transactional artifact, the material packs microservice 120 may function to construct one or more digital material pack search queries based on the target transactional artifact and, in turn, execute the one or more digital material pack search queries against a material pack data repository comprising one or more digital material packs.

In one example of such implementations, the material packs microservice 120 may construct the one or more digital material pack search queries based on outputs of one or more ensembles of machine learning models implemented by the system 100. The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a machine learning classifier, computer vision model, convolutional neural network (e.g., ResNet), visual transformer model (e.g., ViT), object detection model (e.g., R-CNN, YOLO, etc.), regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a semantic image segmentation model, an image instance segmentation model, a panoptic segmentation model, a keypoint detection model, a person segmentation model, an image captioning model, a 3D reconstruction model, a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation from transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

1.30 Purchase Order Processing Module

Figure 3:
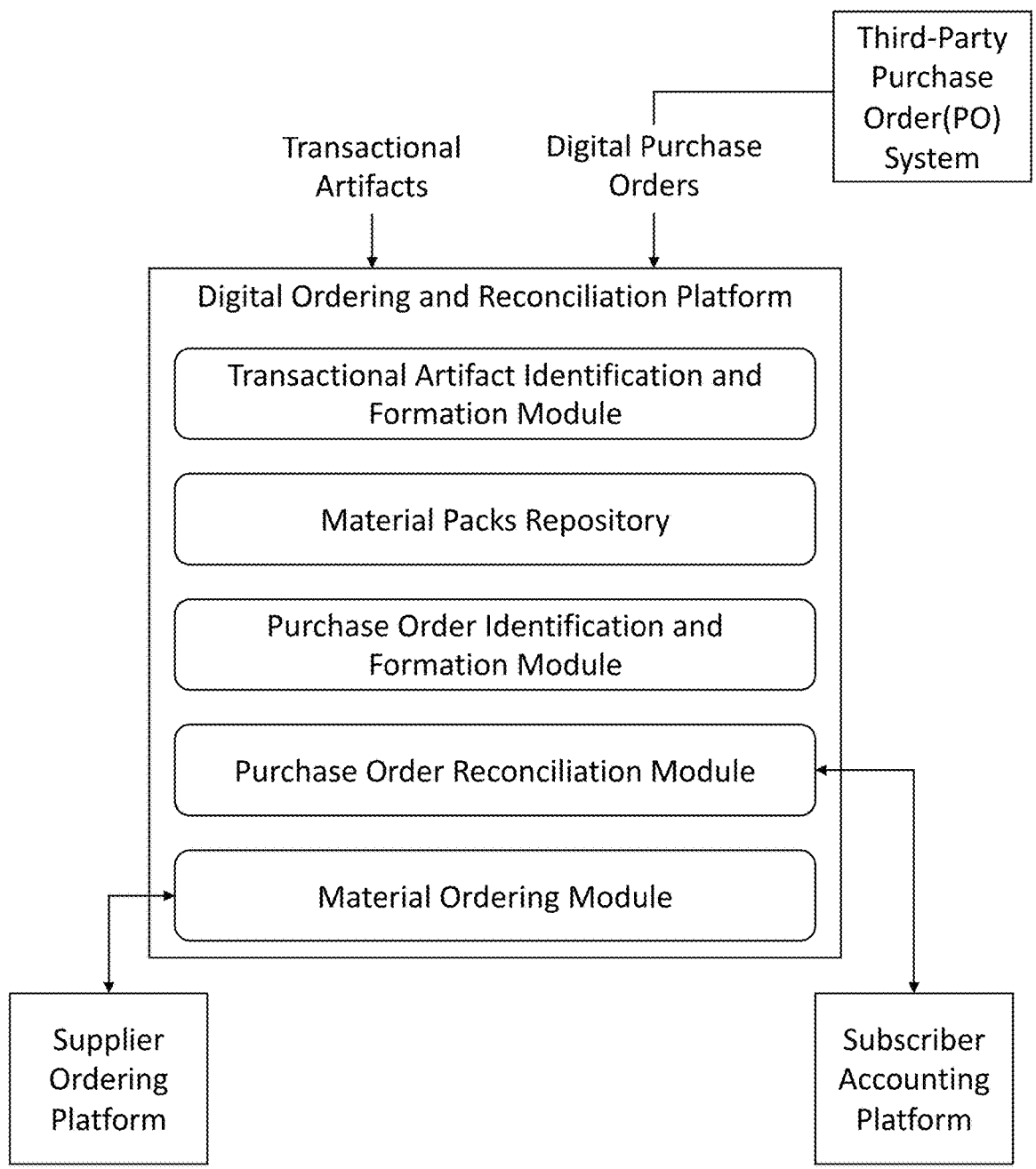
FIG. 3 illustrates a schematic representation for identifying digital purchase orders from one or more third-party purchase order (PO) systems in accordance with one or more embodiments of the present application.

The purchase order processing module 130 may function to source and process one or more digital purchase orders issued to the subscriber by one or more external entities (e.g., homebuilders). In some embodiments, as shown by way of example in FIG. 3, the purchase ordering processing module 130 may source the one or more digital purchase orders by operatively communicating with one or more purchase ordering (PO) systems associated with the one or more external entities.

Additionally, in some embodiments, the purchase order processing module 130 may function to reconcile each of the one or more digital purchase orders issued to the subscriber with a trade artifact. In one implementation of such embodiments, to reconcile a subject digital purchase order, the purchase order processing module 130 may function to search for a transactional artifact in the system 100 matching the subject digital purchase order and, in turn, assess the line item data included in the subject digital purchase order against the line item data included in the transactional artifact. The purchase ordering process module 130, in some embodiments, may successfully reconcile the subject digital purchase order if no differences or less than a threshold number of differences between the line item data of the subject digital purchase order and the line item data of the transactional artifact were identified during the assessment.

Conversely, in some embodiments, the purchase order processing module 130 may generate a reconciliation error for the subject digital purchase order if one or more differences between the line item data of the subject digital purchase order and the line item data of the transactional artifact were identified during the assessment. Additionally, or alternatively, in some embodiments, the purchase order processing module 130 may generate a reconciliation error for the subject digital purchase order if a transactional artifact matching the subject digital purchase order was unable to be identified by the system 100.

1.40 Materials Ordering Microservice

The materials ordering microservice 140 may function to generate a digital material order for each of the one or more transactional artifacts sourced by the transactional artifact sourcing module 110. In some embodiments, the materials ordering microservice 140 may generate a digital material order for each of the one or more transactional artifacts that are associated with a successfully reconciled digital purchase order and, optionally, may forgo generating a digital material order for each of the one or more transactional artifacts that are associated with a reconciliation error.

In one implementation, constructing the digital material order may include defining an application programming interface (API) request. In such an implementation, the materials ordering microservice 140 may function to define a target endpoint for the application programming interface request (e.g., an HTTP or HTTPS endpoint) and an order payload for the application programming interface request. It shall be noted that the target endpoint, as generally referred to herein, may relate to a subscriber-defined or system-defined web destination to which the order payload may be transmitted upon the materials ordering microservice 140 executing the application programming interface request. For instance, in a non-limiting example, the target endpoint may relate to a web destination associated with a target material supplier or vendor. Furthermore, it shall also be noted that, in some embodiments, the order payload may be constructed in a manner that satisfies the format requirements or specifications of the target endpoint.

In some embodiments, the materials ordering microservice 140 may build or construct the order payload based on the one or more material packs determined, via the material packs microservice 120, to be associated with the target transactional artifact. For instance, in a non-limiting example, the materials ordering microservice 140 may function to identify the one or more materials underpinning the one or more material packs that are determined to be associated with the target transactional artifact and, in turn, deposit the one or more materials into the order payload in a format required by the target endpoint (e.g., {digital materials: [material_1, material_2, material 3]}).

Figure 2:
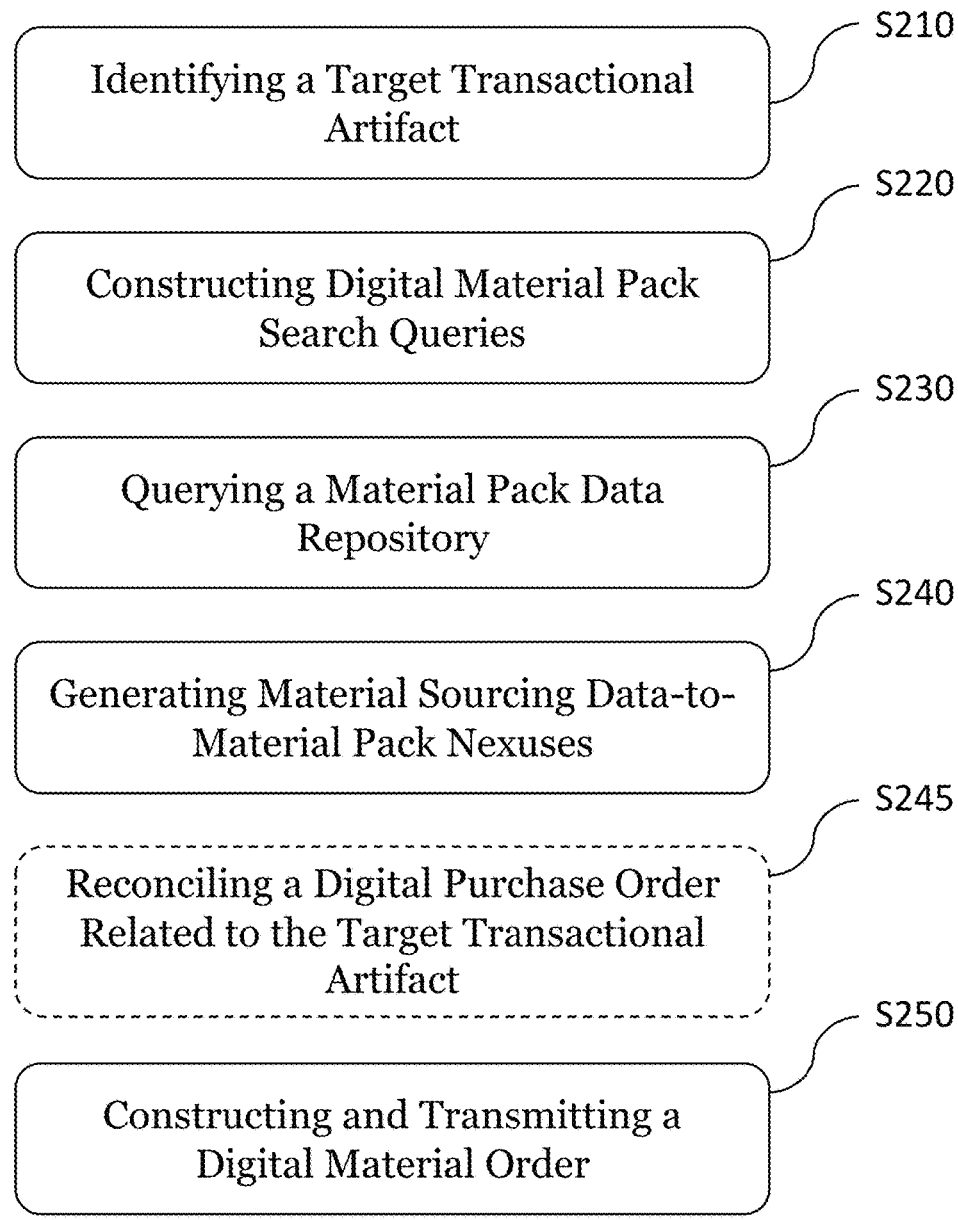
FIG. 2 illustrates an example method 200 in accordance with one or more embodiments of the present application.

2.00 Method for Intelligently Accelerating a Material Ordering Event for a Target Transactional Artifact As shown in FIG. 2, a method for intelligently accelerating a material ordering event for a target transactional artifact may include identifying a target transactional artifact (S210), constructing one or more digital material pack search queries based on the target transactional artifact (S220), querying a material pack data repository based on the one or more digital material pack search queries (S230), generating material sourcing data-to-material pack nexuses based on the querying of the material data pack repository (S240), optionally reconciling a digital purchase order associated with the target transactional artifact (S245), and constructing and transmitting a digital material order based at least on the target transactional artifact (S250).

It shall be appreciated that other examples contemplated within the scope of the present disclosure may involve more operations, fewer operations, different operations, or a different order of operations than as shown in FIG. 2.

2.10 Identifying a Target Transactional Artifact

S210, which includes identifying a target transactional artifact, may function to source or obtain a target transactional artifact associated with a subscriber. In some embodiments, the target transactional artifact (also referred to herein as a "governing digital artifact") may relate to a contractual artifact between the subscriber and one or more external entities for performing one or more construction-related tasks. For instance, in a non-limiting example, the target transactional artifact may relate to a contractual agreement that engages the subscriber (e.g., subcontractor) to perform one or more construction-related tasks for an external entity (e.g., homebuilder, general contractor, homeowner, business owner, and/or the like).

Figure 6:
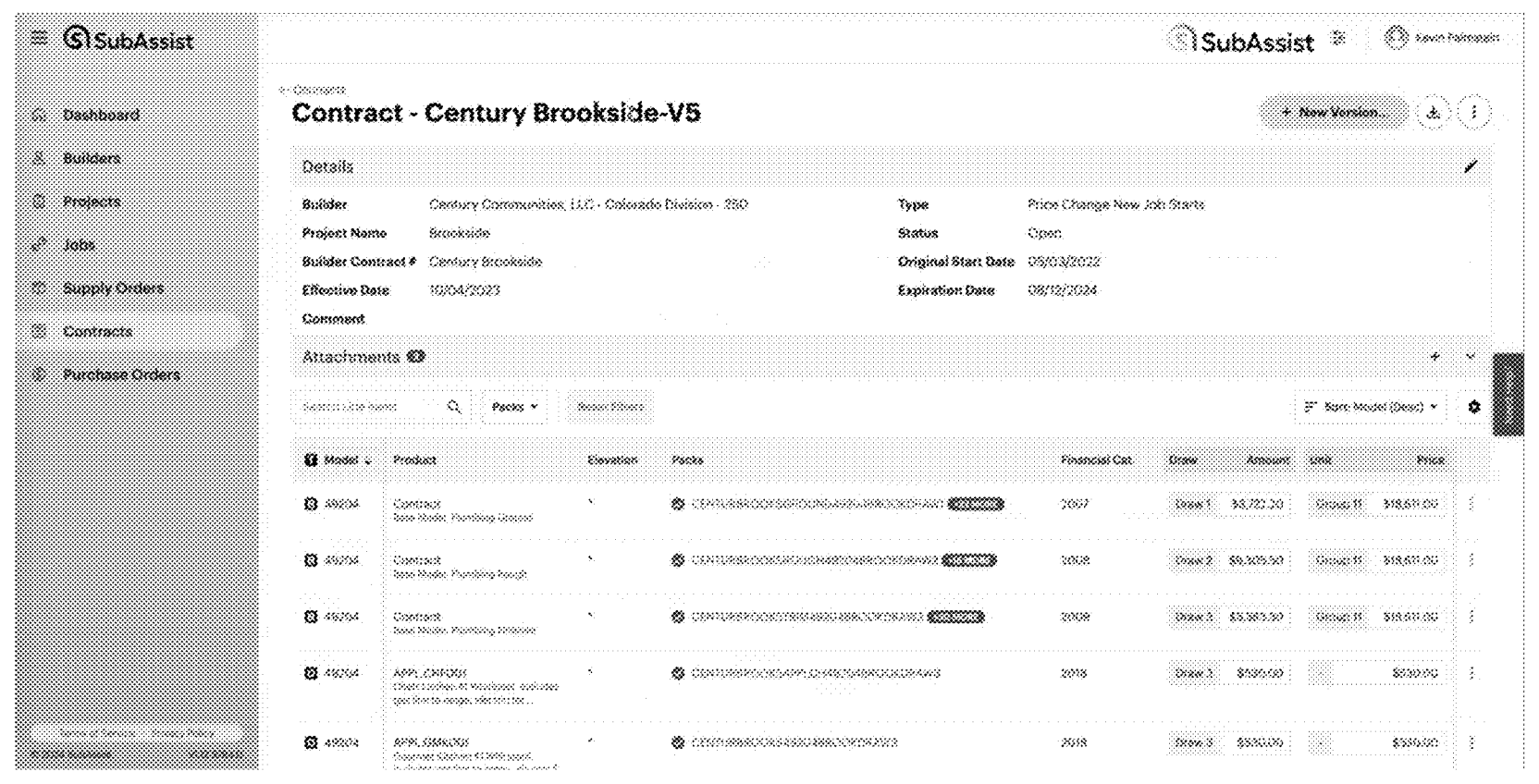

In some embodiments, as illustrated in FIG. 6, the target transactional artifact may include one or more pieces of transaction header data. The one or more pieces of transactional header data, as generally referred to herein, may include or define properties of the target transactional artifact, such as an identification (ID) value of the target transactional artifact, an identification (ID) value of an entity (e.g., customer) associated with the target transactional artifact, a name of the entity (e.g., customer) associated with the target transactional artifact, a name of a project associated with the target transactional artifact, a type of the target transactional artifact (e.g., Price Change or Original), a start date of the target transactional artifact, an effective date of the target transactional artifact, an expiration date of the target transactional artifact, general comments associated with the target transactional artifact, and/or the like.

Furthermore, in some embodiments, as also illustrated in FIG. 6, the target transactional artifact identified by S210 may include one or more pieces of transaction detail data. The one or more pieces of transaction detail data, as generally referred to herein, may include or define the one or more construction-related materials, services, or tasks associated with the target transactional artifact and, optionally, attributes or properties of the one or more constructed-related materials, services, or tasks. It shall be noted that, in some portions of the disclosure, the one or more pieces of transaction detail data included in the target transactional artifact may be referred to as "line items of the target transactional artifact," "transactional line items of the target transactional artifact," "contract line items of the target transactional artifact," "line item data of the target transactional artifact," or similar recitations.

In some embodiments, as illustrated in FIG. 6, a respective transactional line item included in a target transactional artifact may include one or more attributes. Example attributes of a transactional line item may include, but should not be limited to, a 'model' attribute, a 'product' attribute, a 'elevation' attribute, a 'packs' attribute, a 'financial cat.' attribute, a 'draw & amount' attribute, a 'unit & price' attribute. The 'model' attribute may specify the design or blueprint of the construction project to which the respective transactional line item pertains. The 'product' attribute may define the specific task or job to which the respective transactional line item pertains. The 'elevation' attribute may be the architectural elevation or section where the product is to be applied or installed within the construction project.

The 'packs' attribute may refer to predefined sets of materials and supplies, required by the respective transactional line item (e.g., construction-related job task). The value of this attribute, as described in more detail herein, may be determined by one or more of the processes described below (e.g., S220, S230, S240, or the like). Additionally, or alternatively, in some embodiments, the 'packs' attribute may aid the method 200 in facilitating the organization and ordering of materials in bulk. The 'financial category' attribute may classify the transactional line item's expenses into the appropriate budgetary year, budgetary classification, or cost center, thus aiding the method 200 in financial tracking and reporting. The 'draw & amount' attribute may represent the scheduled payment or disbursement of funds associated with the completion of the task specified by the respective transactional line item.

Lastly, the 'unit & price' attribute may indicate the group and cost per individual unit of product or material as specified in the transactional line item. Collectively, these attributes may enable the method 200 to accurately match purchase orders with contractual obligations, manage financial transactions, and ensure that the correct materials are ordered and delivered in accordance with the project's specifications and timelines.

Obtaining the Target Transactional Artifact from the Subscriber

Figure 7:
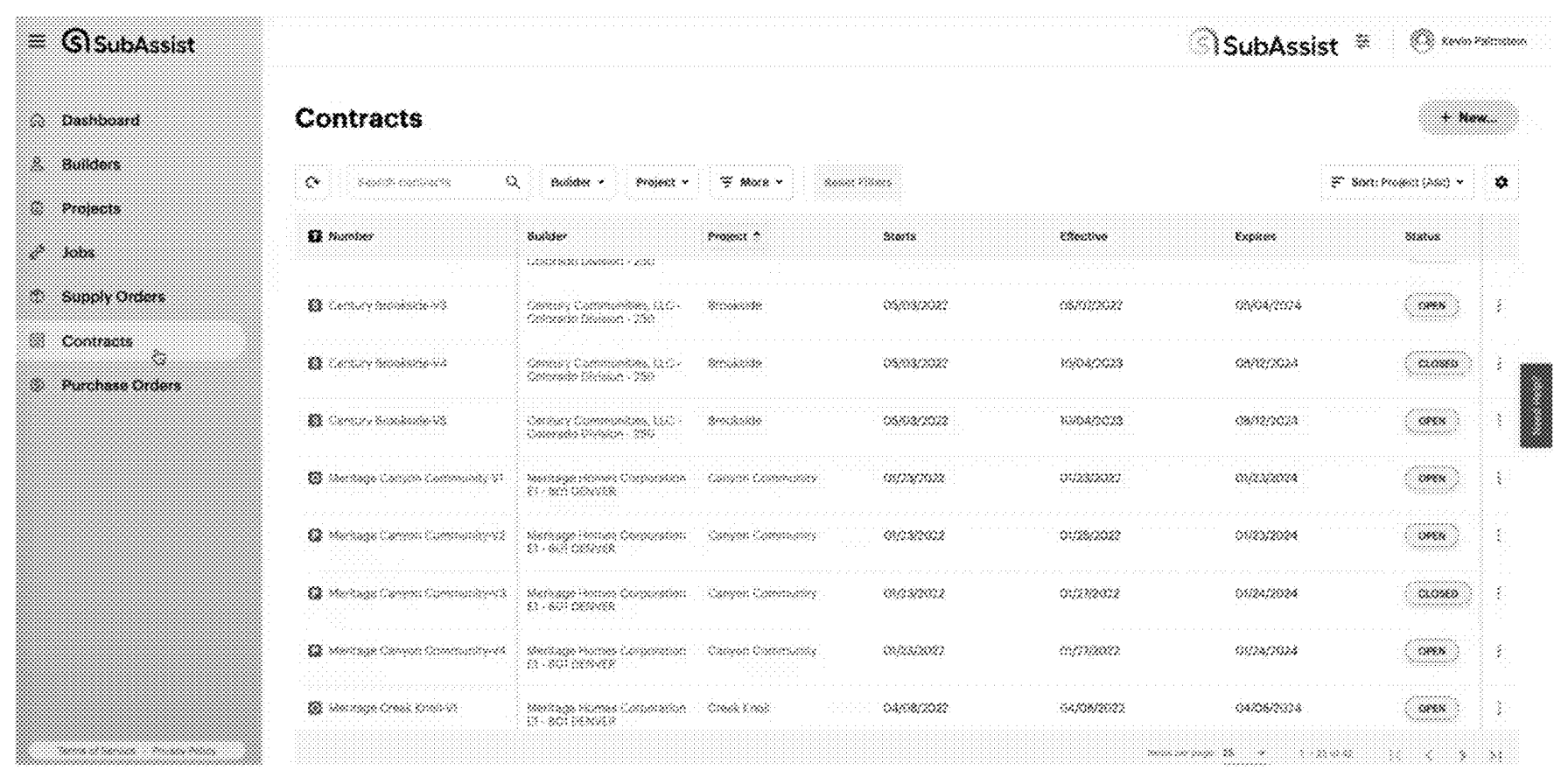

In some embodiments, identifying the target transactional artifact may include obtaining or sourcing the target transactional artifact from the subscriber. In one implementation of such embodiments, as illustrated in FIG. 7, the target transactional artifact may be obtained or sourced from the subscriber via one or more graphical user interfaces (GUIs) implemented by S210. The one or more graphical user interfaces (GUIs) implemented by S210, in some embodiments, may be digitally accessible by the subscriber(s) of a system or service implementing the method 200 and/or may enable the subscriber(s) to upload or transmit one or more target transactional artifacts to the system or service. It shall be noted that, in some portions of the disclosure, a target transactional artifact may be referred to as a respective transactional artifact, a contractual artifact, or similar recitations.

In some embodiments, as illustrated in FIG. 7, a graphical user interface configured to obtain one or more target transactional artifacts from the subscriber may include, among other user interface elements, an artifact upload user interface element. In one example, based on S210 detecting a subscriber selection of the artifact upload user interface element, S210—in turn—may function to display a file browsing user interface that includes one or more representations of transactional artifacts that the subscriber may select for upload to the system or service implementing the method 200.

It shall be noted that the above examples are not intended to be limiting and that S210 may function to implement additional or different graphical user interfaces for obtaining one or more transactional artifacts from the subscriber. Furthermore, it shall also be noted that, in some embodiments, S210 may additionally or alternatively function to implement any other suitable technique for obtaining the target transactional artifact from the subscriber including, but not limited to, one or more command line interfaces (CLIs), one or more application programming interfaces (APIs), or the like.

Extracting a Corpus of Material Sourcing Data

Figure 4:
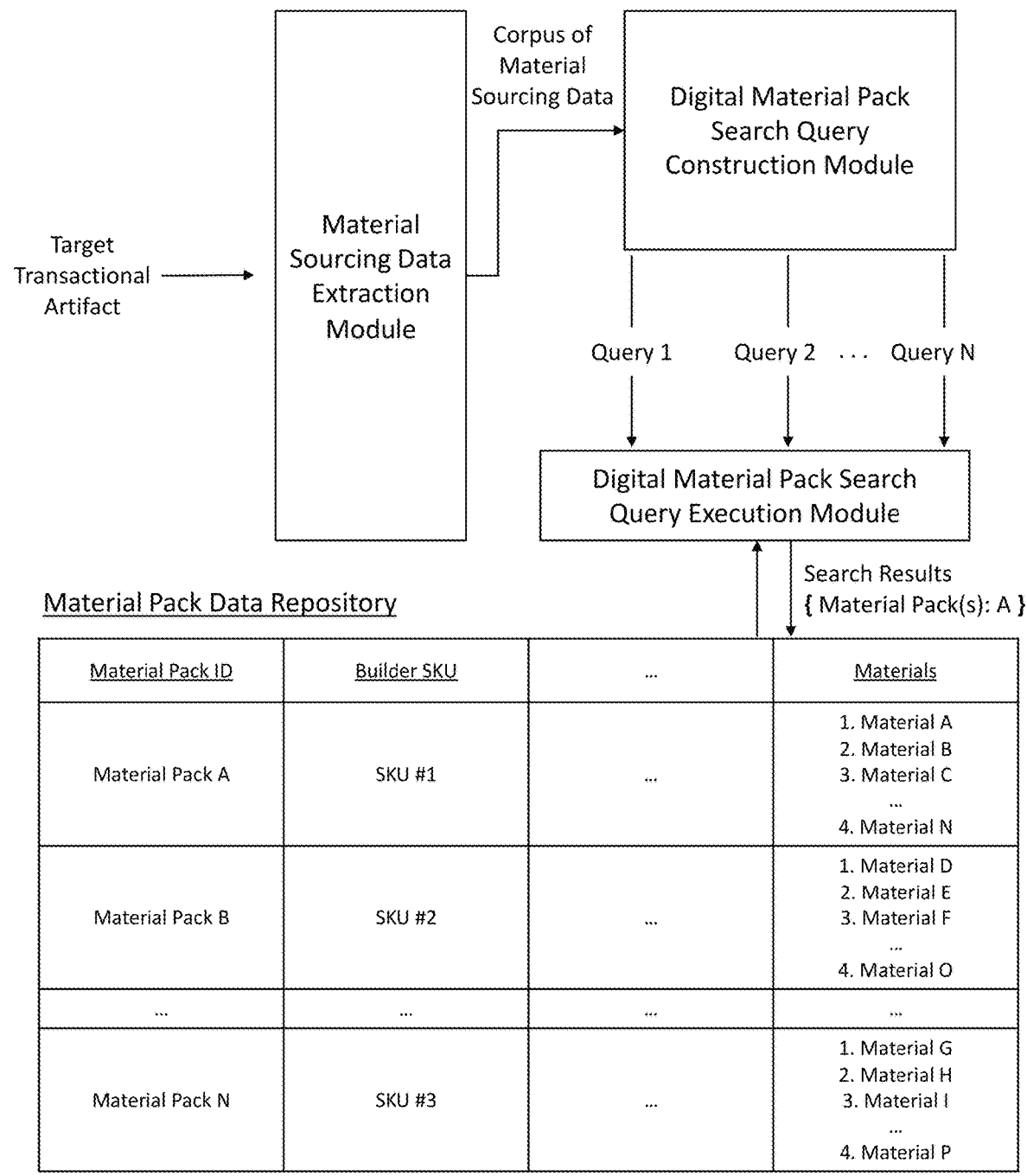
FIG. 4 illustrates a schematic representation for identifying digital material packs associated with a target transactional artifact in accordance with one or more embodiments of the present application.

Additionally, or alternatively, in some embodiments and as generally illustrated in FIG. 4, S210 may function to extract a corpus of material sourcing data from the target transactional artifact. It shall be noted that, in some portions of the disclosure, the corpus of material sourcing data may be referred to as "material sourcing data," "line item data," "a corpus of sourcing requisition feature data," or similar recitations.

In one implementation, the corpus of material sourcing data may be outputted or generated by one or more line item detection and extraction algorithms implemented by S210. The one or more line item detection and extraction algorithms, in some embodiments, may function to detect one or more data elements (e.g., rows or columns) in the target transactional artifact that may be configured to store line item data, and in turn, extract the line item data stored in those one or more data elements. Thus, in some embodiments, the corpus of material sourcing data extracted from the target transactional artifact may comprise one or more distinct data entries corresponding to the one or more distinct line items included in the target transactional artifact.

In some embodiments, to determine if a target data element (e.g., column or row) of the target transactional artifact may be configured to store line item data, S210 may function to compare a name or identifier (ID) value of the target data element against a list of names or ID values of data elements (e.g., columns or rows) known to be associated with the storing of line item data. That is, in some embodiments, if the name of the target data element matches (or is semantically similar) to a name or ID value of a data element (e.g., column) known to be associated with the storing of line item data, S210 may function to determine that the target data element may be configured to store line item data. Conversely, if the name of the target data element does not match (or is not semantically similar) to any of the names or ID values of data elements (e.g., columns) known to be associated with the storing of line item data, S210 may function to determine that the target data element may not be configured to store line item data. It shall be noted that, in some embodiments, the list of names or ID values of data elements (e.g., columns or rows) known to be associated with the storing of material sourcing data may be set by the subscriber, an administrator of the system or service implementing the method 200, a creator of the system or service implementing the method 200, or the like.

It shall also be noted that S210 may implement any suitable technique or method to extract the name or ID associated with the one or more data elements (e.g., columns) underpinning the target transactional artifact. Example suitable techniques or methods may include, but may not be limited to, column iteration algorithms, row iteration algorithms, data element iteration algorithms, computer vision algorithms, optical character recognition (OCR) machine learning models or processes, named-entity recognition (NER) machine learning models, or the like.

Contractual Artifact Repository||Governing Artifacts Database

In some embodiments, the obtained or uploaded transactional artifact(s) may be added to a contractual artifact repository (also referred to as a "governing artifacts database"). The contractual artifact repository, as generally referred to herein, may be a digital store system that is configured to store a plurality of contractual or transactional artifact records ("governing digital artifact records"). The plurality of contractual artifact records, in some embodiments, may be queried to allow users or automated processes to search for and retrieve specific artifacts based on various search/retrieval criteria.

In some embodiments, the contractual artifact repository may support a range of query types, from single-parameter lookups of specific documents to complex searches involving multiple parameters. For instance, in a non-limiting example, users or automated processes may query the repository to find all contracts associated with a particular homebuilder, contractor, project, or material type. The system may also allow for advanced queries that can filter results based on contract dates, status, or other metadata associated with the contractual artifacts.

In some implementations, a contractual artifact record within the repository may be associated with a target contractual artifact (e.g., a governing artifact, a specific contract or agreement relevant to the construction project). This association, as described in more detail, may establish a direct link or association between a purchase order and the contractual obligations agreed upon by the involved parties. Additionally, or alternatively, a contractual artifact record may directly or indirectly enumerate a plurality of transactional line items associated with the target contractual artifact (also referred to as itemizing the tasks, jobs, services, or materials as stipulated in the contract). Lastly, in some embodiments, one or more of the plurality of transactional line items may be digitally linked to one or more digital material packs contained within a material pack repository. These digital material packs may comprise predefined sets of materials and supplies that are requisite for the completion of the associated job tasks.

2.20 Constructing Digital Material Pack Search Queries

S220, which includes constructing digital material pack search queries, may function to build or define one or more digital material pack search queries based on the corpus of material sourcing data extracted in S210. In some embodiments, the one or more digital material pack search queries constructed by S220 may each relate to a distinct piece of material sourcing data in the corpus of material sourcing data and, when executed in the manner described herein, may enable the method 200 to discover digital material packs related to each distinct piece of material sourcing data in the corpus of material sourcing data.

For instance, as described previously, in some embodiments the corpus of material sourcing data may include one or more line items extracted from the target transactional artifact. Thus, in some embodiments, S220 may function to construct a digital material pack search for each of the one or more distinct line items extracted from the target transactional artifact and, when executed by S220, may enable the method 200 to discover one or more digital material packs related to each distinct line item extracted from the target transactional artifact.

Extracting Material Sourcing Search Tokens

In some embodiments, constructing a digital material pack search query for a distinct piece of material sourcing data in the corpus of material sourcing data may include extracting one or more material sourcing search tokens from the distinct piece of material sourcing data. In one implementation, S220 may implement a material sourcing token extraction algorithm to extract the one or more material sourcing search tokens from the distinct piece of material sourcing data. The material sourcing token extraction algorithm, in some embodiments, may be configured to receive the distinct piece of material sourcing data as input (e.g., a line item) and output one or more material sourcing search token extracted from the distinct piece of material sourcing data based on one or more material sourcing token extraction rules of the material sourcing token extraction algorithm.

In some embodiments, the one or more material sourcing token extraction rules may extract one or more material sourcing search tokens from the distinct piece of material sourcing data that matches or satisfies project code data patterns of one or more external entities (e.g., homebuilders). That is, in some embodiments, based on the material sourcing token extraction algorithm receiving a distinct piece of material sourcing data as input (e.g., a line item), the one or more material sourcing token extraction rules may function to search for one or more sequences of characters in the distinct piece of material sourcing data that match the project code data patterns and output those one or more sequences of characters as material sourcing search tokens, if any exist.

Additionally, or alternatively, in some embodiments, the one or more material sourcing token extraction rules may extract one or more material sourcing search tokens from the distinct piece of material sourcing data that satisfy or match stock keeping unit (SKU) data patterns of one or more external entities (e.g., homebuilders). That is, in some embodiments, based on the material sourcing token extraction algorithm receiving a distinct piece of material sourcing data as input (e.g., a line item), the one or more material sourcing token extraction rules may function to search for one or more sequences of characters in the distinct piece of material sourcing data that match the SKU data patterns and output those one or more sequences of characters as material sourcing search tokens (if any exist).

Furthermore, in some embodiments, the one or more material sourcing token extraction rules may extract one or more material sourcing search tokens from the distinct piece of material sourcing data that satisfy or match line item description data patterns of one or more external entities (e.g., homebuilders). That is, in some embodiments, based on the material sourcing token extraction algorithm receiving a distinct piece of material sourcing data as input (e.g., a line item), the one or more material sourcing token extraction rules may function to search for one or more sequences of characters in the distinct piece of material sourcing data that match the line item description data patterns and output those one or more sequences of characters as material sourcing search tokens (if any exist).

Extracting Material Sourcing Search Tokens based on a Data Arrangement Schema

Additionally, or alternatively, in a second implementation, S220 may function to extract the one or more material sourcing search tokens from the distinct piece of material sourcing data based on a data arrangement schema associated with the distinct piece of material sourcing data. The data arrangement schema associated with the distinct piece of material sourcing data, as generally referred to herein, may define a name or identifying value (ID) of one or more dimensions (e.g., columns) associated with the distinct piece of material sourcing data. For instance, in a non-limiting example, the data arrangement schema may define that a first dimension of the distinct piece of material sourcing data stores a first type of data (e.g., item number data), a second dimension of the distinct piece of material sourcing data stores a second type of data (e.g., SKU data), a third dimension of the distinct piece of material sourcing data stores a third type of data (e.g., Unit Cost Data), a fourth dimension of the distinct piece of material sourcing data stores a fourth type of data (e.g., Item Description Data), and/or the like.

In some embodiments, S220 may function to extract data positioned along one or more target dimensions of the distinct piece of material sourcing data as material sourcing search tokens. For instance, in a non-limiting example, S220 may function to extract the data stored along the first dimension of the distinct piece of material sourcing data and the fourth dimension of the distinct piece of material sourcing data as distinct material sourcing search tokens. It shall be noted that the above example is not intended to be limiting, that the distinct piece of material sourcing data may include additional, different, or fewer dimensions without departing from the scope of the inventions contemplated herein, and that S220 may extract data stored along additional, fewer, or different dimensions of the distinct piece of material sourcing data without departing from the scope of the invention(s) contemplated herein.

Constructing a Digital Material Pack Search Query

In some embodiments, S220 may function to construct a digital material pack search query based on the one or more material sourcing search tokens extracted from the distinct piece of material sourcing data. In one implementation, the digital material pack search query may be or relate to a Boolean search query. Thus, in some embodiments, constructing the digital material pack search query may include deriving one or more Boolean conditions based on the one or more material sourcing search tokens extracted from the distinct piece of material sourcing data and, in turn, adding the one or more derived Boolean conditions to the digital material pack search query as search parameters. It shall be noted that, once added to the digital material pack search query, the one or more derived Boolean conditions may cause the digital material pack search query to search for and return one or more digital material packs satisfying such Boolean conditions.

In some embodiments, deriving the one or more Boolean conditions for the digital material pack search query may include deriving one or more Boolean conditions that, when executed, cause the digital material pack search to search for digital material packs having an attribute equal to the one or more subject material sourcing search tokens. For instance, in a non-limiting example, based on extracting a material search token comprising a SKU number associated with the distinct piece of material sourcing data, S220 may function to construct a Boolean condition that causes the digital material pack search to search for and return digital material packs relating to the SKU number.

Embeddings-Based Digital Material Pack Search Query

Additionally, or alternatively, in a second implementation, the digital material pack search query may be or relate to an embeddings search query. Thus, in some embodiments, constructing the digital material pack search query may include deriving one or more embedding search conditions based on the one or more material sourcing search tokens extracted from the distinct piece of material sourcing data and, in turn, adding the one or more embedding search conditions to the digital material pack search query as search parameters. It shall be noted that, once added to the digital material pack search query, the one or more derived embedding search conditions may cause the digital material pack search query to search for and return one or more digital material packs that may be within a threshold embedding distance of the one or more embedding search conditions.

In some embodiments, deriving the one or more embedding search conditions may include computing an embedding inference for a subject material sourcing search token via a word embeddings model implemented by S220 and, in turn, setting a similarity search parameter of the digital material pack search query to search for one or more digital material packs that have an embedding value within a threshold distance of the embedding inference computed for the subject material sourcing search token.

Regular Expression-Based Digital Material Pack Search Query

Additionally, or alternatively, in a third implementation, the digital material pack search query may be or relate to a regular expression search query. Thus, in some embodiments, constructing the digital material pack search query may include deriving one or more regular expressions based on the one or more material sourcing search tokens extracted from the distinct piece of material sourcing data and, in turn, adding the one or more derived regular expressions to the digital material pack search query as search parameters. It shall be noted that, once added to the digital material pack search query, the one or more derived regular expressions may cause the digital material pack search query to search for and return one or more digital material that have attributes satisfying such regular expressions.

2.30 Querying a Material Pack Data Repository|Material Pack Discovery

S230, which includes querying a material pack data repository, may function to discover (e.g., obtain) one or more digital material packs associated with the target transactional artifact based on executing the one or more digital material pack search queries constructed in S220. In some embodiments, the material pack data repository, as generally referred to herein, may comprise one or more data structures that store a collection of data associated with one or more digital material packs in an indexable and/or quarriable manner (also referred to as an "item assembly database").

Put differently, the material pack repository may be a digital storage system designed to store a collection of digital material packs (e.g., one or more assemblies of items).

It shall be noted that, in some embodiments, storing data associated with the one or more digital material packs in an indexable manner may enable the method 200 to identify one or more digital material packs in the material pack data repository that satisfy search criteria of the one or more digital material pack search queries constructed in S220. It shall also be noted that a digital material pack, as generally referred to herein, may be related to a distinct construction-related task and, optionally, may define one or more materials or items required for performing the distinct constructed related-task. In other words, a respective digital material pack stored within the material pack repository may correspond to a distinct construction-related job task and/or may define a group of materials and supplies that are required for the distinct construction-related job task.

Embeddings-Based Material Pack Data Repository

In one implementation, the material pack data repository may relate to or comprise an n-dimensional space storing one or more n-dimensional vectors at distinct positions or locations in the n-dimensional space. The one or more n-dimensional vectors of the n-dimensional space, in some embodiments, may each correspond to a distinct embedding representation of a subject digital material pack. For instance, in a non-limiting example, a first n-dimensional vector of the one or more n-dimensional vectors stored in the n-dimensional space may correspond to an embedding representation computed for a first digital material pack, and a second n-dimensional vector of the one or more n-dimensional vectors stored in the n-dimensional space may correspond to an embedding representation computed for a second digital material pack.

In some embodiments, S230 may implement an unsupervised machine learning model (e.g., an embedding model, transformer model, or the like) to compute an embedding representation for a subject digital material pack. The unsupervised machine learning model, in some embodiments, may be configured to receive, as input, one or more features of the subject digital material pack and, in turn, generate an embedding representation of the subject digital material pack based on the one or more features provided as input.

Executing Embeddings-Based Digital Material Pack Search Queries

In some embodiments, discovering or obtaining the one or more digital material packs associated with the target transactional artifact may include executing the one or more embeddings-based digital material pack search queries constructed in S220. In one example, executing a subject embeddings-based digital material pack search query may cause S230 to search for and return embedding representations in the n-dimensional space that may be within a threshold embedding distance of the embeddings search criteria defined in the subject embeddings-based digital material pack search query. It shall be noted that, in some embodiments, the subject embeddings-based digital material pack search query may return zero (0) embedding representations from the n-dimensional space if S230 determined that zero (0) embedding representations stored in the n-dimensional space were within the threshold embedding distance of the embeddings search criteria defined in the subject embeddings-based digital material pack search query.

In some embodiments, searching for embedding representations in the n-dimensional space that may be within a threshold embedding distance of the embeddings search criteria defined in the subject embeddings-based digital material pack search query may include computing a (e.g., Euclidean, cosine, etc.) distance metric between each embedding search criterion of the embeddings search criteria and each embedding representation stored in the n-dimensional space. Thus, in some embodiments, S230 may function to return, as search results, one or more embedding representations in the n-dimensional space that may be associated with distance metrics that satisfy the threshold embedding distance and forgo returning, as search results, one or more embedding representations in the n-dimensional space that may be associated with distance metrics that do not satisfy the threshold embedding distance.

Tabular-Based Material Pack Data Repository

In a second implementation, the material pack data repository may be or relate to a database, a table, a tabular data structure, or the like. Thus, in some embodiments, the material pack data repository may comprise one or more rows and one or more columns. The one or more rows of the material pack data repository may each relate to a distinct digital material pack and the one or more columns of the material pack data repository may each relate to a distinct feature of the distinct digital material pack. For instance, in a non-limiting example, a subject row in the digital material pack repository may store an identifying (ID) value or name associated with a subject digital material pack along a first dimension (e.g., column) of the material pack data repository, one or more materials associated with the subject digital material pack along a second dimension (e.g., column) of the material pack data repository, an SKU number (e.g., product code) associated with the subject digital material pack along a third dimension (e.g., column) of the material pack data repository, or the like.

It shall be noted that the above examples are not intended to be limiting and that the material pack data repository may store data associated with the one or more digital material packs in different ways without departing from the scope of the invention(s) contemplated herein.

Executing Boolean-Based Digital Material Pack Search Queries

In some embodiments, discovering or obtaining the one or more digital material packs associated with the target transactional artifact may include executing the one or more Boolean-based digital material pack search queries constructed in S220. In one example, executing a subject Boolean-based digital material pack search query may cause S230 to search for and return one or more records (e.g., rows) in the material pack data repository that may satisfy the Boolean search criteria defined in the subject Boolean-based digital material pack search query. It shall be noted that, in some embodiments, the subject Boolean-based digital material pack search query may return zero (0) records from the material pack data repository if S230 determined that zero (0) records in the material pack data repository satisfy the Boolean search criteria of the subject Boolean-based digital material pack search query.

In some embodiments, S230 may determine that a record (e.g., entry) in the material pack data repository satisfies the Boolean search criteria of the subject Boolean-based if an attribute associated with the record satisfies the Boolean search criteria. For instance, in a non-limiting example, if the Boolean search criteria includes a Boolean criterion such as "SKU==123456789," S230 may determine that a record having an SKU attribute equal to "123456789" satisfies the Boolean search criteria and may determine that a record that does not have an SKU attribute equal to "123456789" does not satisfy the Boolean search criteria.

Material Pack Rules

In addition to the search mechanisms described, the system may also implement material pack rules that govern the inclusion or exclusion of material packs based on data present in the purchase order. These rules may be complex, involving multiple attributes and conditions, and may be designed to ensure that the material packs selected for a job task are the ones that are truly relevant and appropriate for the specific requirements of that task. For instance, in a non-limiting example, the material pack rules may be based on purchase order data fields such as elevation, project location, or the orientation of the construction (e.g., left or right swing). Accordingly, by applying these rules, the method 200 may be able to dynamically adjust the material packs included in a digital order to match the precise requirements set forth in a purchase order.

2.40 Generating Material Sourcing Data-to-Material Pack Nexuses

S240, which includes generating material sourcing data-to-material pack nexuses, may function to digitally associate each piece of material sourcing data (e.g., each line item) of the target transactional artifact with one or more digital material packs based on the search results of S230. In some embodiments, the one or more material sourcing data-to-material pack nexuses may each relate to a distinct piece of material sourcing data extracted from the target transactional artifact and, optionally, may define a digital mapping between the distinct piece of material sourcing data extracted from the target transactional artifact and the one or more digital material packs associated with the distinct piece of material sourcing data.

In some embodiments, generating the material sourcing data-to-material pack nexuses may include generating a distinct material sourcing data-to-material pack nexus for each distinct piece of material sourcing data extracted from the target transactional artifact. In one implementation, generating the distinct material sourcing-data-to-material pack nexus for a subject piece of material sourcing data (e.g., line item) may include inserting or depositing, into the distinct material sourcing-data-to-material pack nexus, a first entry value corresponding to a name or ID of the subject piece of material sourcing data and a second entry value comprising the one or more digital material packs associated with the subject piece of material sourcing data.

In some embodiments, S230 may function to form the above-mentioned second entry value based on the results returned from executing one or more digital material pack search queries associated with the subject piece of material sourcing data. For instance, in a non-limiting example, if the one or more digital material pack search queries associated with the subject piece of material sourcing data returned a first, a second, and a third digital material pack, the second entry value inserted into the distinct material sourcing-data-to-material pack nexus may at least comprise a name or ID of the first, the second, and third digital material packs.

Additionally, or alternatively, in some embodiments of the first implementation, generating the distinct material sourcing-data-to-material pack nexus for a subject piece of material sourcing data (e.g., line item) may include inserting or depositing, into the distinct material sourcing-data-to-material pack nexus, a third entry value comprising the digital material(s) underpinning the one or more digital material packs associated with the subject piece of material sourcing data. Thus, in some embodiments, S240 may function to obtain or identify the digital material(s) associated with the digital material packs returned from executing the one or more digital material pack search queries and, in turn, deposit the digital material(s) into the third entry value.

It shall be noted that, in some embodiments, S240 may function to determine the digital material(s) associated with a subject digital material pack by referencing or accessing an entry in the material data pack repository corresponding to the subject digital material pack. In one example, as described previously, an entry in the material data pack repository may store pieces of data associated with a subject digital material along one or more dimensions, such a name or ID of the subject digital material data pack, the names or IDs of the one or more materials associated with the subject digital material data pack, and/or the like. Thus, in some embodiments, S240 may function to determine the digital material(s) associated with the subject digital material pack by referencing data stored along a target dimension of the entry corresponding to the subject digital material pack (e.g., the dimension that stores the names or IDs of the one or more materials associated with the subject digital material data pack).

Storing the Material Sourcing Data-to-Material Pack Nexuses

In some embodiments, S240 may store the one or more material sourcing data-to-material pack nexuses in any suitable data storage repository or data structure. In one implementation, S240 may function to store the one or more material sourcing data-to-material pack nexuses in a single reference data table comprising one or more rows and columns. In one example of this implementation, S240 may function to store each of the one or more material sourcing data-to-material pack nexuses in a distinct row or column of the single reference data table.

Alternatively, in a second implementation, S240 may function to store the one or more material sourcing data-to-material pack nexuses in a data structure comprising multiple distinct components, parts, or reference structures. In one example, S240 may function to store a first component associated with each material sourcing data-to-material pack nexus in a first data structure, a second component associated with each material sourcing data-to-material pack nexus in a second data structure, a third component associated with each material sourcing data-to-material pack nexus in a third data structure, and/or the like. In such embodiments, each entry in a subject data structure may include one or more reference pointers that point to corresponding entries in the one or more other reference data structures.

2.45 Reconciling a Digital Purchase Order

S245, which includes reconciling a digital purchase order, may function to obtain and/or reconcile a digital purchase order associated with the target transactional artifact based on the material sourcing data-to-material pack nexuses generated in S240 (also referred to as contract line item-to-material pack nexuses). In some embodiments, the digital purchase order may be issued by an external construction-related entity (e.g., homebuilder) to the subscriber and may define one or more products or services that the external entity is acquiring (e.g., purchasing) from the subscriber.

In some embodiments, the one or more products or services that the external entity is acquiring from the subscriber may be defined or digitally itemized in the digital purchase order as line items (commonly referred to herein as "purchase order data," "purchase order line items," "physical components," or the like). In such embodiments, each line item in the purchase order artifact may correspond to a distinct construction-related (e.g., real-world) task, product or service and may include one or more attributes.

Figure 8:
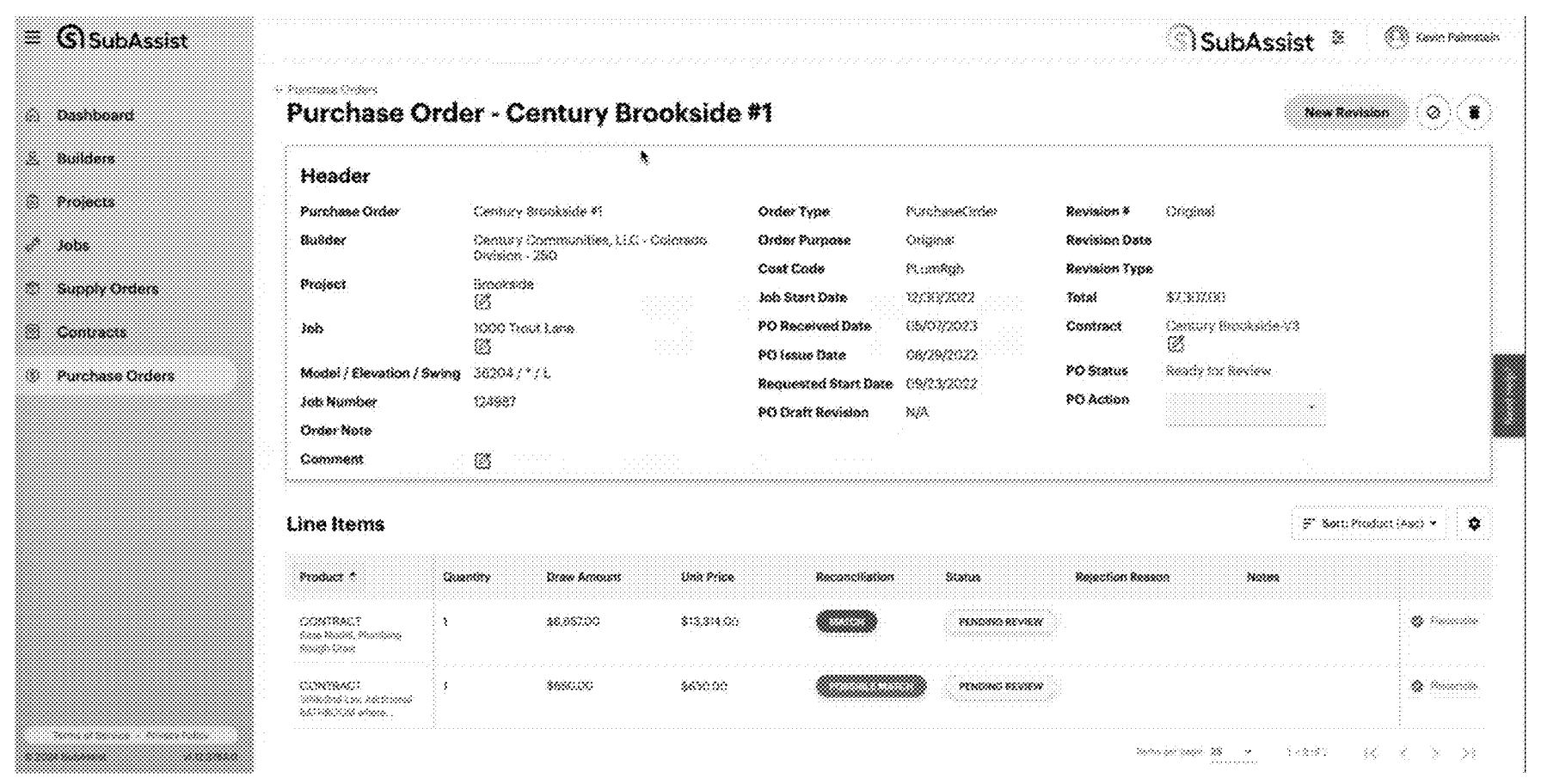

For instance, in the non-limiting example illustrated in FIG. 8, a distinct line item in the digital purchase order may include a first attribute indicating a quantity of a distinct product or service associated with a real-world task, a second attribute indicating a unit price of the distinct product or service, a third attribute indicating a name and/or description of the distinct product or service, a fourth attribute indicating a product code associated with the distinct product or service, a fifth attribute indicating a draw amount associated with the distinct product or service, a sixth attribute indicating a reconciliation status of the distinct line item, a seventh attribute indicating a review status of the distinct line item, an eighth attribute indicating a rejection reason for distinct line item, a ninth attribute indicating notes associated the distinct line item, and/or the like.

Furthermore, in some implementations, as illustrated in FIG. 8, a digital purchase order may include a variety of header data attributes (e.g., key-value attribute pairs). These attributes, collectively referred to as purchase order header data, may encompass or define the characteristics of the digital purchase order. Such attributes may include, but should not be limited to, an identification (ID) value of the purchase order, which serves as a distinct identifier for the document. The name of the builder or external entity issuing the purchase order to the subcontractor may also be included in the purchase order header data, along with a project identifier that denotes the specific construction project or community for which the purchase order is issued.

The purchase order may further specify a job identifier or address, which details the individual construction-related task or site. Model/elevation/swing information may also be included to detail the design specifications or orientation of the construction task. A job number may also be included in the purchase order header data and may provide an additional layer of identification for the construction task within the project. Order notes and comments may also be included in the purchase order header data for displaying special instructions or clarifications related to the digital purchase order.

Additionally, the purchase order header data may classify the purchase order according to its nature (e.g., initial order, change order) and its intent (e.g., material procurement, service request) through the order type and purpose attributes. The cost code attribute may specify the particular budgetary account or financial category associated with the construction-related tasks or materials listed in the purchase order. The job start date attribute may indicate when the construction-related task is scheduled to commence, while the PO received date attribute and PO issue date attribute may record when the purchase order was received by the subcontractor and when it was officially issued by the builder, respectively.

Furthermore, the requested start date attribute may specify when the builder or external entity desires the work to begin. The purchase order, in some embodiments, may undergo various revisions, tracked by the PO draft revision attribute, revision number attribute, and revision date attribute, which monitor the versioning and updates made to the purchase order over time. The revision type attribute may describe the nature of changes made in a particular revision, such as pricing updates or scope modifications. The total value attribute of the purchase order may represent the aggregate cost of the construction-related tasks or materials specified within the document.

Furthermore, the contract association attribute may link the purchase order to a specific contractual agreement between the builder and the subcontractor. The PO status attribute may indicate the current processing stage of the purchase order, such as pending, accepted, or completed. Lastly, the PO action attribute may list potential or completed actions taken in response to the purchase order, such as accepted, rejected, material order placed, service scheduled, or the like. It shall be noted that, in some embodiments, these attributes are leveraged by various components and processes of the method 200 to facilitate the processing, reconciliation, and fulfillment of purchase orders in an efficient and error-reduced manner.

It shall also be noted that, in some embodiments, S245 may obtain a purchase order in a variety of ways. One such method may involve the digitization of unstructured physical artifacts. In this scenario, S245 may obtain a (e.g., user-uploaded) copy of an unstructured physical document via a graphical user interface. S245 may then apply optical character recognition (OCR) processes to extract a corpus of sourcing requisition feature data from the document. This extracted data may encapsulate all the relevant details of the sourcing requisition, which are then structured into a digital sourcing requisition data structure that is compatible with the system or service implementing the method.

Another method for obtaining a purchase order may be through direct integration with external software systems. S245 may leverage an application programming interface (API) to download the digital sourcing requisition. Subsequently, S245 may normalize the data fields of the requisition to conform to a standardized data format. It shall be noted that this standardization may ensure that the data structure is consistent and interoperable with the system or service in use.

Reconciling Purchase Ordering Data|Purchase Order Line Items

In some embodiments, reconciling the digital purchase order may include reconciling each distinct piece of purchase ordering data (e.g., line item) defined in the digital purchase order. In such embodiments, to reconcile a subject piece of purchase ordering data (e.g., purchase order line item), S245 may function to identify a distinct piece of material sourcing data (e.g., contract line item) in the target transactional artifact that corresponds to the subject piece of purchase ordering data. In turn, based on identifying the distinct piece of material sourcing data, S245 may function to assess one or more of the pieces of purchasing data underpinning the distinct piece of purchase ordering data (e.g., line items, physical components, etc.) against the one or more pieces of material data underpinning the distinct piece of material sourcing data (e.g., line items, multi-attribute data tuples, etc.).

In some embodiments, S245 may function to successfully reconcile the subject piece of purchase ordering data (e.g., line item) if S245 determines that each piece of piece of purchasing data underpinning the subject piece of purchase ordering data matches or is equivalent to a related piece of material data underpinning the distinct piece of material sourcing data. Conversely, in some embodiments, S245 may function to generate a reconciliation warning or error for the distinct piece of purchase ordering data (e.g., line item) if S245 determines that at least one piece of purchasing data underpinning the distinct piece of purchase ordering data does not match or is not equivalent to a related piece of material data underpinning the distinct piece of material sourcing data. It shall also be noted that, in some embodiments, S245 may also function to generate a reconciliation error for the distinct piece of purchase ordering data (e.g., line item) if S245 could not correlate the distinct piece of purchase ordering data to a distinct piece of material sourcing data (e.g., line item) in the target transactional artifact.

In one implementation, S245 may function to implement (and execute) one or more data equivalency rules to assess an equivalency of a subject piece of purchasing data against a subject piece of material data. The one or more data equivalency rules may determine that the subject piece of purchasing data may be equivalent (or substantially equivalent) to the subject piece of material data if both pieces of data relate to the same object(s), character(s), word(s), or phrase(s). Conversely, in some embodiments, the one or more data equivalency rules may determine that the subject piece of purchasing data may not be equivalent (or substantially equivalent) to the subject piece of material data if both pieces of data relate to different character(s), word(s), or phrase(s).

Computer-Implemented Artifact Matching Instructions

In some embodiments, reconciling the electronic purchase order may include executing a set of computer-implemented artifact matching instructions. The set of computer-implemented artifact matching instructions may function to automatically (e.g., pairwise) match the electronic purchase order to a corresponding contractual artifact record stored within a contractual artifact repository. For instance, in a non-limiting example, the artifact matching instructions may include a series of computer-implemented logical steps, rules, or algorithms that begin with the identification or extraction of relevant data from the electronic purchase order, such as project identifiers (e.g., project code key-value attribute pair), job start date (e.g., job start date key-value attribute pair), one or more other date-related key-value attribute pairs, and/or the like. This data (or a subset of the data) may then be processed, in a pairwise manner, against the records stored within a contractual artifact repository through a search algorithm that may use exact matching or more advanced matching methods like fuzzy logic to accommodate minor discrepancies in terminology or data entry.

The artifact matching instructions may also account for variations in contract formats and structures, adapting the matching criteria to the specific data fields and values that are characteristic of each contract type. By doing so, the method 200 can reliably identify the correct contractual artifact, even in cases where the purchase order and contract documents have been generated by different entities or software systems. Upon finding a (pairwise) match, the method 200 may automatically update the status of the purchase order to reflect its reconciliation with the contract. Conversely, in the event that a clear match is not found, the method 200 may flag the purchase order for manual review, ensuring that any ambiguities are resolved by a human operator to maintain the integrity of the procurement process.

In some embodiments, the (pairwise) search process within the contractual artifact repository may yield multiple potential candidate records that match for a given project. This may occur when there are multiple versions of a contract in existence, each potentially valid during overlapping or distinct time periods. The system's artifact matching instructions may be designed to handle such complexities by not just identifying a project data field match but also by considering the temporal context of the job start date. It shall be noted that, in some portions of the disclosure, a respective candidate record may be referred to as a candidate governing digital artifact record or the like.

For instance, when the artifact matching instructions execute a search that returns multiple candidate contractual artifact records corresponding to the same project data field, the method 200 may proceed to refine the selection process based on the job start date data field contained within the electronic purchase order. That is, the job start date serves as a chronological anchor, enabling the method 200 to discern which contract version is likely in effect at the time the work was scheduled to commence. By comparing the job start date against the effective dates of the various contract versions, the system may be able to select the contractual artifact record that not just matches the project identifier but also aligns with the correct temporal context. This ensures that the purchase order is reconciled against the contract version that was intended to govern the work at that specific point in time, thereby maintaining contractual fidelity and accuracy in the procurement process.

Computer-Implemented Reconciliation Directives

Additionally, or alternatively, in some embodiments, reconciling the digital purchase order may include executing a set of computer-implemented reconciliation directives. The set of computer-implemented reconciliation directives, as generally used herein, may function to assistively match, in a pairwise manner, each purchase order line item of the electronic purchase order to an equivalent or semantically similar contractual line item in the target contractual artifact. This process may involve the use of heuristic algorithms, pattern recognition, or machine learning models to analyze and compare the semantic and syntactic elements of each purchase order line item against the corresponding elements of the contractual line items.

In one implementation, the reconciliation directives may employ a heuristic comparison algorithm that performs one or more pairwise assessments to evaluate the similarity between the purchase order line items and the contractual line items based on predefined criteria and rules. These criteria may include, but are not limited to, matching product codes, descriptions, quantities, unit prices, and/or other relevant data fields. The heuristic comparison algorithm may also compute a match score to each potential candidate pairing, with higher scores indicating a stronger match between the purchase order line item and the contractual line item, as generally illustrated in FIGS. 9-10.

In another implementation, the reconciliation directives may utilize machine learning models that have been trained on historical data to predict the likelihood of a pairwise match (e.g., pairwise semantic match) between purchase order line items and contractual line items. These models may consider various factors such as past purchasing patterns, common substitutions, and supplier-specific nuances to enhance the accuracy of the matching process.

Figure 9:
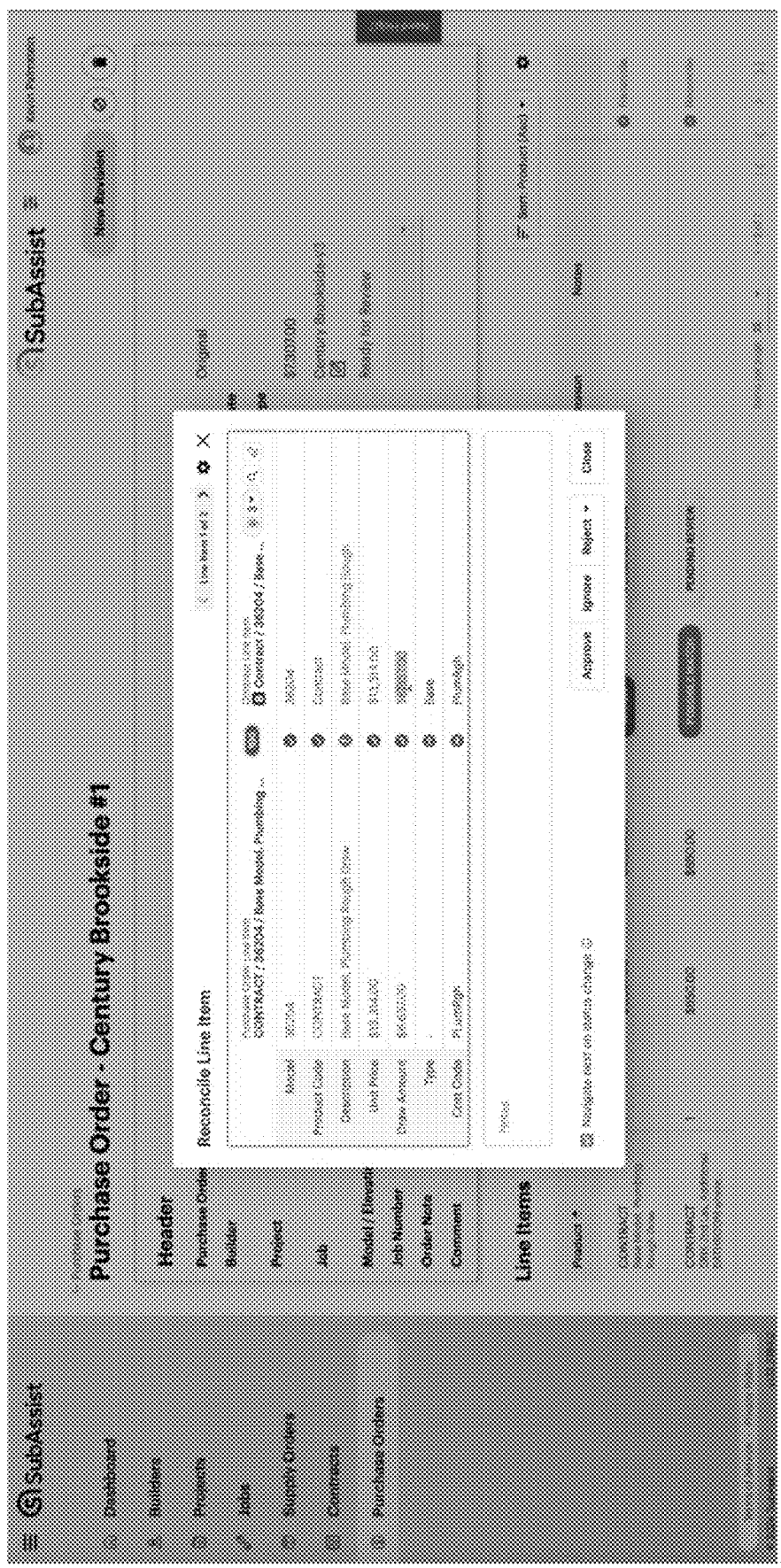
Figure 10:
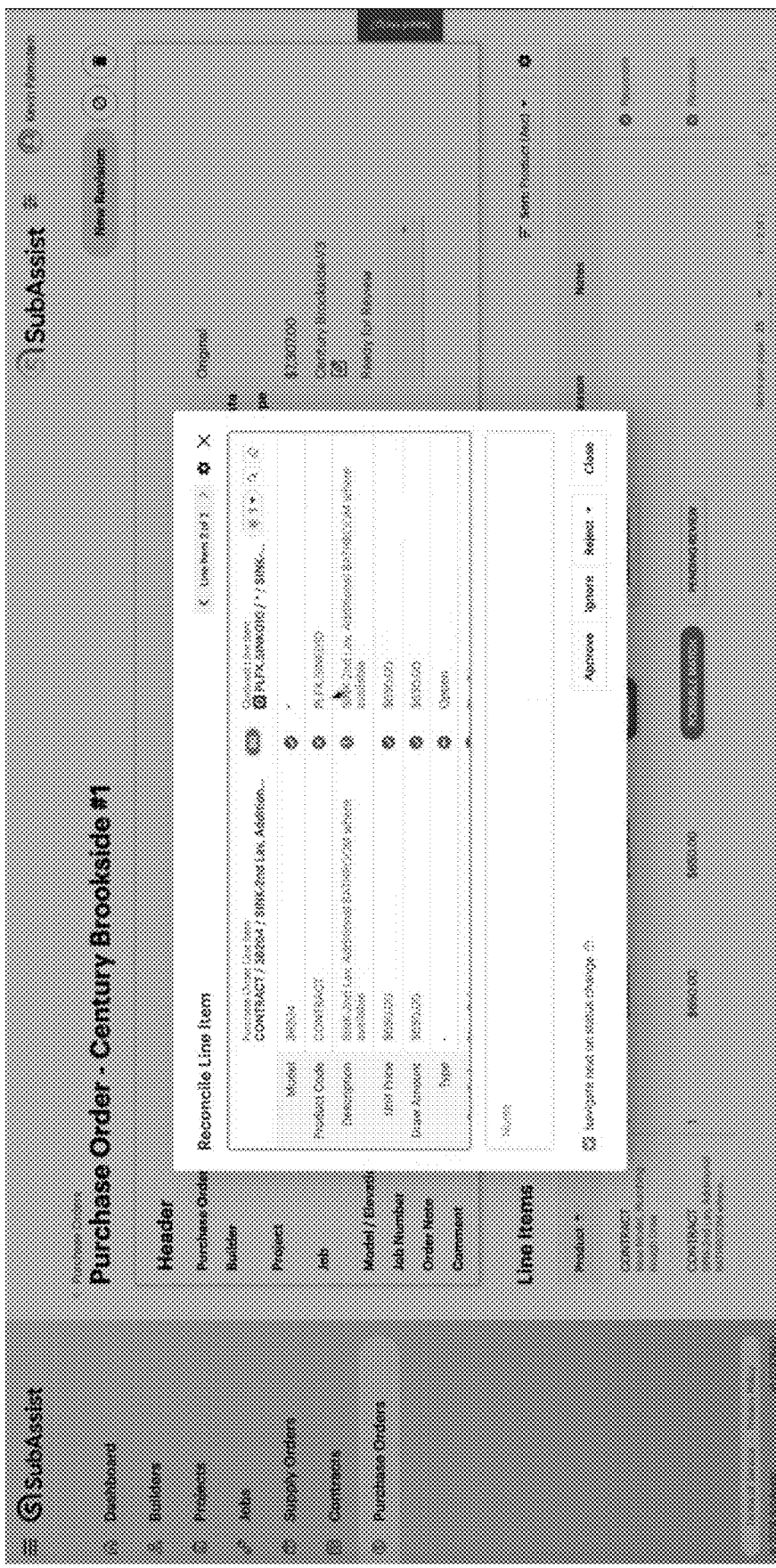

Additionally, as illustrated in FIGS. 9 and 10, the reconciliation directives may also include a user-based or system-based confirmation and validation step, where the system-proposed matches are displayed in a graphical user interface for review and confirmation by a user or may be automatically accepted based on predefined confidence thresholds. If the match score for a particular pairing (e.g., pairwise match) exceeds a predetermined threshold, the pairwise match may be automatically accepted. Conversely, if the match score is below the threshold, the pairing may be flagged for manual review. It shall be noted that in the event that multiple potential pairwise matches are identified for a single purchase order line item, the reconciliation directives may prioritize the matches based on the match scores. The match with the highest score, indicating the greatest degree of similarity, may be selected as the preferred match.

Accordingly, this approach ensures that the method 200 favors the pairing that is statistically the closest representation of the intended contractual line item, thereby reducing the likelihood of errors in the reconciliation process.

Furthermore, the reconciliation directives may be configured to handle exceptions and anomalies, such as when a purchase order line item does not have a direct match within the contractual artifact. In such cases, the directives may suggest alternative matches, prompt the user for additional input, or initiate a query to the external entity for clarification.

The output of the reconciliation directives may be a reconciled purchase order that accurately reflects the terms and conditions of the target contractual artifact. This reconciled purchase order can then be used to generate accurate invoices, update project management systems, and/or facilitate the ordering of materials and supplies in accordance with the contractual agreement. It shall be noted that, in some portions of the disclosure, the one or more processes described above may be referred to as "performing a pairwise assessment between each physical component in the digital sourcing requisition and each of the plurality of multi-attribute data tuples associated with the governing digital artifact record."

2.50 Constructing and Transmitting a Digital Material Order

S250, which includes constructing and transmitting a digital material order, may function to generate a digital material order for the target transactional artifact based on the one or more material sourcing data-to-material pack nexuses identified in S240, pairwise assessment matches generated by the method 200, and/or optionally based on a reconciliation status of the digital purchase order associated with the target transactional artifact. For instance, in a non-limiting example, S250 may function to automatically construct a digital material order for the target transactional artifact based on S245 successfully reconciling the digital purchase order associated with the target transactional artifact and may forgo automatically constructing the digital material order until S245 successfully reconciles the digital purchase order associated with the target transactional artifact. It shall be noted that, in some portions of the disclosure, a digital material order may be referred to as a "digital components acquisition request" or the like.

In one implementation, constructing the digital material order may include defining an application programming interface (API) request. In this implementation, S250 may function to define a target endpoint for the application programming interface request (e.g., an HTTP or HTTPS endpoint) and an order payload for the application programming interface request. It shall be noted that the target endpoint, as generally referred to herein, may relate to a subscriber-defined or system-defined web destination to which the order payload may be transmitted upon S250 executing the application programming interface request (e.g., a web destination associated with a material supplier or vendor).

In some embodiments, S250 may construct or define the order payload based on requirements or specifications of the target endpoint (e.g., electronic communication preferences of a target external supplier). That is, in some embodiments, S250 may function to construct the order payload in a machine-readable format that may be familiar to or expected by the target endpoint (or target external supplier). Furthermore, in some embodiments, defining the order payload may include referencing the one or more material sourcing data-to-material packs nexuses generated for the target transactional artifact, identifying the one or more digital material packs defined in the one or more material sourcing data-to-material packs nexuses, and depositing the one or more materials associated with the one or more digital material packs into the order payload in a format required by the target endpoint (e.g., {digital materials: [material_1, material_2, material 3]}).

It shall be noted that, in some embodiments, referencing and identifying the one or more digital material packs may be referred to as "collecting materials and requisite quantities" or "identifying one or more assemblies of items based on the plurality of pairwise assessment matches." Similarly, it shall also be noted that, in some embodiments, depositing the one or more materials associated with the one or more digital material packs may be referred to as "enumerating the materials and requisite quantities" or "programmatically installing, into the digital components acquisition request, items and associated quantities defined in each of the one or more assemblies of items."

For instance, consider an example wherein the method 200 matched, among others, a first and a second physical component of a digital sourcing requisition to a first and a second multi-attribute data tuple of a governing digital artifact record, respectively. In such an example, S250 may function to construct the digital components acquisition request by first identifying one or more assemblies of items associated with the first multi-attribute data tuple and one or more assemblies of items associated with the second multi-attribute data tuple. This may be done by accessing any suitable reference table, look up structure, or database that contains the predefined associations between the multi-attribute data tuples and the corresponding assemblies of items.

Once the method 200 has accessed the appropriate reference table or structure, it may then retrieve the relevant assemblies of items that correspond to the matched multi-attribute data tuples. The method 200 may in turn, compile these assemblies into a comprehensive list that reflects all the materials and their requisite quantities for the digital components acquisition request. This process ensures that the request is accurate and aligns with the project's material requirements as defined by the governing digital artifact record.

Following these processes, S250 may programmatically install the enumerated materials and quantities into the digital components acquisition request. Specifically, this step may format the comprehensive list into a structured document or data file that is compatible with the electronic ordering systems used by suppliers or the procurement systems. This completed digital components acquisition request, as described below, may now be ready for automated transmission to the target external supplier for order fulfillment.

In one alternative implementation, as previously described above, the method 200 may assist in matching purchase order line items with corresponding transactional line items within a contractual artifact. Accordingly, when a transactional line item is linked to multiple digital material packs, the generation of the digital material order may involve aggregating the materials and quantities listed in each pack. This process may include calculating the net quantity for each material by accounting for any additions or subtractions specified across the linked material packs. Put differently, in some embodiments, generating the digital material order may include calculating a net quantity for each obtained material. The net quantity of a respective material may be computed by subtracting, from the net quantity, negative item quantity values associated with the respective material across the one or more assemblies of items, and adding, to the net quantity, positive item quantity values associated with the respective material across the one or more assemblies of items. Additionally, in some embodiments, generating the digital material order may also include programmatically installing the net quantity calculated for each of the items into the digital components acquisition request.

Furthermore, in a second alternative implementation, S250 may consider scenarios where a transactional line item is associated with several digital material packs. In such an implementation, the generation of the digital material order may include applying predefined computer-implemented material pack rules or computer-implemented item assembly rules to determine the inclusion or exclusion of materials associated with each pack. The materials and their quantities may then be aggregated according to the outcome of these rules, ensuring that the final material order accurately reflects the requisite quantities.

In yet another alternative implementation, the method 200 may generate a digital material order by constructing an API request tailored to the preferences of the target external supplier. This process may involve defining a target endpoint and formulating a payload that includes a detailed list of materials and quantities derived from the digital material packs associated with the matched transactional line item. Specifically, in some embodiments, the payload for the digital material order may be formatted to align with the electronic communication preferences of the target external supplier. This ensures that the order can be processed and fulfilled efficiently, with the system automating the transmission of the order to the supplier.

Lastly, in another alternative implementation, the method 200 may generate a digital material order by creating and populating a tabular data structure. This data structure may be designed to systematically organize the materials and their respective quantities as specified in the digital material packs. The tabular format may be particularly advantageous as it presents the order in a clear and concise manner, which is conducive to easy review and efficient processing by the supplier.

The tabular data structure, once populated by S250, may comprise rows and columns, where each row represents a distinct material or item from the digital material packs. The columns may include details such as the material name or description, the requisite quantity, the unit price, and any other relevant information that the supplier may require for order fulfillment. By populating this tabular structure with the appropriate data, the system ensures that all materials from the digital material packs are accounted for and presented in an organized fashion.

Transmitting the Digital Material Order

Accordingly, in some embodiments, transmitting the digital material order may include executing the application programming interface (API) request constructed for the digital material order. In such embodiments, upon (or based on) executing the application programing interface request, S250 may function to transmit the order payload defined in the application programing interface request over a computer network to the target destination associated with the application programing interface request.

Figure 5:
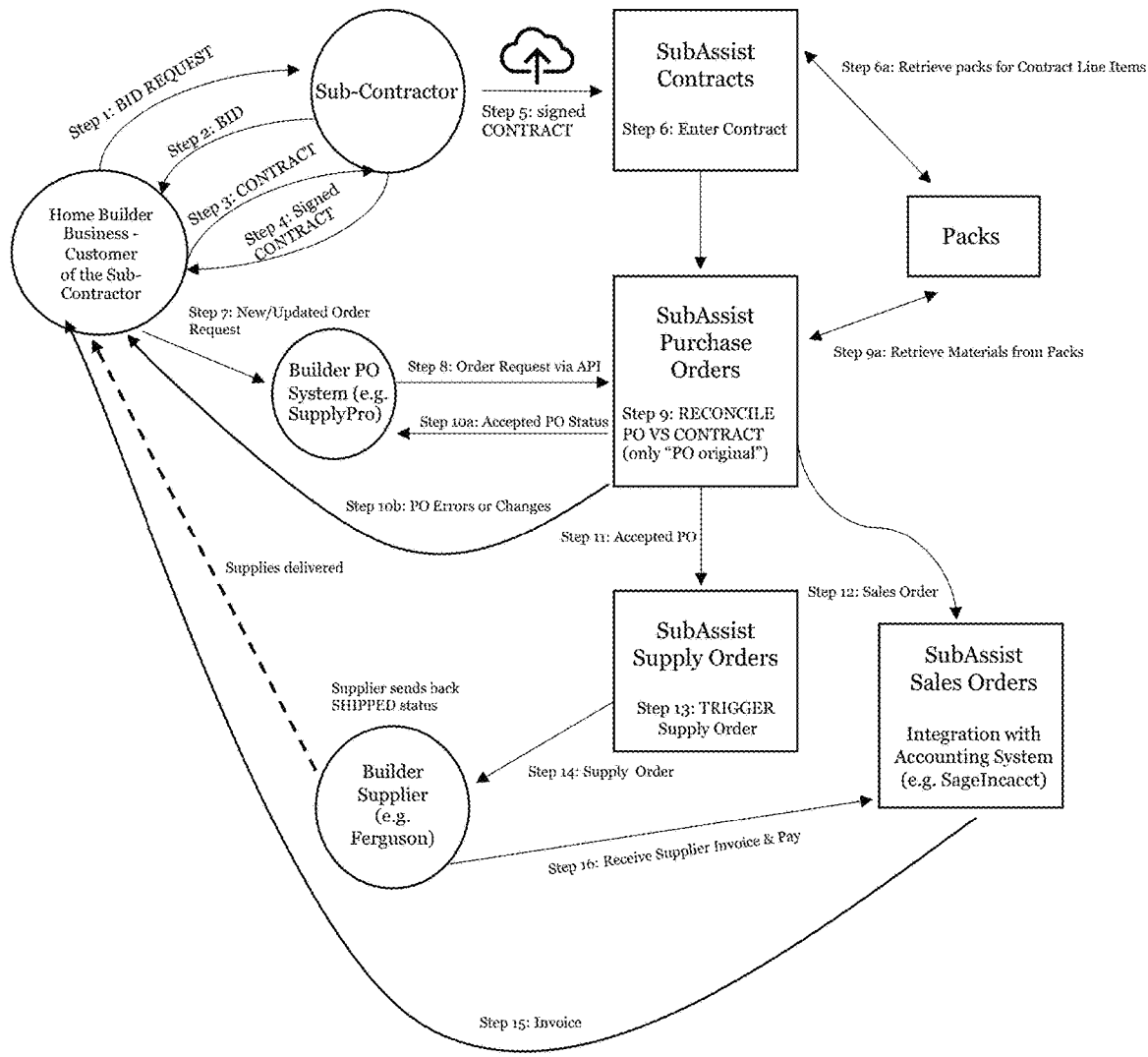
FIG. 5 illustrates an example schematic for constructing and executing digital material orders based on digital material packs associated with a target transactional artifact in accordance with one or more embodiments of the present application.

In one example, the target destination associated with the application programming interface request may relate to a web destination associated with a material supplier or vendor. Thus, in such embodiments, transmitting the digital material order via the application programming interface request, may enable the subscriber to efficiently transmit a digital material order to a material supplier or vendor without explicit manual interaction from the subscriber. It shall be noted that transmitting a digital material to a web destination (e.g., API destination) associated with a material supplier or vendor in the manner described herein may enable the material supplier or vendor to process (e.g., fulfill) the digital material order and, optionally, ship/deliver the one or more materials associated with the digital material to the subscriber (as generally illustrated in FIG. 5).

Additionally, or alternatively, to the API-based transmission of digital material orders, S250 may transmit the digital material order via email. In this alternative implementation, S250 provides a versatile and widely accessible means of communication that can be particularly useful when interfacing with material suppliers or vendors who may prefer or require order submissions in this format.

In such implementations, upon constructing the digital material order, the system may generate an email message that includes the tabular data structure as an attachment or within the body of the email. The email message may then be directed to the target destination (e.g., the email address associated with the material supplier or vendor). It shall be noted that this process may be automated by the method 200, allowing for the digital material order to be sent promptly upon order generation, without the subscriber needing to manually intervene or manage the email transmission.

For instance, in a non-limiting example, the method 200 may attach a spreadsheet or a document containing the tabular data structure of the digital material order to the email. The email may also include additional information such as a cover letter, specific instructions, or any other relevant details that would assist the supplier in processing the order. The subject line and body of the email may also be pre-formulated to include pertinent information such as the purchase order number, project name, or delivery date, ensuring that the supplier receives a comprehensive and actionable order.

3. Computer-Implemented Method and Computer Program Product

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A computer-implemented method for automatically generating and transmitting a digital components acquisition request, the computer-implemented method comprising:
obtaining, by a microservice, a digital sourcing requisition that includes a digital itemization of a plurality of physical components required for completing a plurality of real-world tasks;
in response to an input of the digital sourcing requisition, automatically extracting, by the microservice executing a token extraction algorithm, a plurality of search tokens from the digital sourcing requisition, the plurality of search tokens comprising a plurality of key-value attribute pairs;
using the plurality of key-value attribute pairs to automatically construct by the microservice, one or more digital search queries for identifying and retrieving from a target computer database a given governing artifact, wherein the microservice constructs each of the one or more digital search queries by including at least one of the plurality of key-value attribute pairs a given digital search query of the one or more digital search queries and search logic comprising Boolean logic or regular expression;
using the one or more digital search queries to automatically query, by the microservice, one or more data structures of a governing artifacts database that store an index of a plurality of governing artifacts;
retrieving, from the governing artifacts database, a governing digital artifact record based on the querying of the one or more data structures of the governing artifacts data;
assessing, by one or more computer processors executing artifact matching computer instructions, the digital itemization of the plurality of physical components of the digital sourcing requisition against a plurality of multi-attribute data tuples associated with the governing digital artifact record, wherein assessing the digital itemization of the plurality of physical components includes:
  (i) performing, by the one or more computer processors, a pairwise assessment between each physical component in the digital itemization and each of the plurality of multi-attribute data tuples associated with the governing digital artifact record, and
  (ii) when the pairwise assessment between a respective physical component of the plurality of physical components and a respective multi-attribute data tuple of the plurality of multi-attribute data tuples results in at least a semantic match, displaying the semantic match between the respective physical component and the respective multi-attribute data tuple in a graphical user interface for user verification and approval;
automatically generating, by the one or more computer processors, a digital components acquisition request based on a plurality of pairwise assessment matches produced during the assessing, wherein generating the digital components acquisition request includes:
  (a) identifying, by the one or more computer processors, one or more assemblies of items based on a digital mapping of at least the plurality of multi-attribute data tuples of the plurality of pairwise assessment matches to a plurality of assemblies of items associated with the governing digital artifact, and
  (b) automatically generating, by the one or more processors, a structured digital components acquisition request by programmatically installing, by the one or more computer processors, into the structured digital components acquisition request, items and associated quantities defined in each of the one or more assemblies of items; and
automatically transmitting, over a computer network, the digital components acquisition request to a target external entity for physically sourcing the items delineated in the digital components acquisition request.

2. The computer-implemented method according to claim 1, wherein:
the governing artifacts database includes a plurality of governing digital artifact records, and
retrieving the governing digital artifact record from the governing artifacts database includes executing the artifact matching instructions that automatically match the digital sourcing requisition to a corresponding governing digital artifact record of the plurality of governing digital artifact records by:
  identifying one or more date-related key-value attribute pairs and a project code key-value attribute pair from the digital sourcing requisition,
  searching the governing artifacts database for one or more candidate governing digital artifact records that correspond to a value of the project code key-value attribute pair, and
  selecting one of the one or more candidate governing digital artifact records returned from the searching as the corresponding governing digital artifact record based on a value of the one or more date-related key-value attribute pairs.

3. The computer-implemented method according to claim 1, wherein:
the governing digital artifact record retrieved from the governing artifacts database:
  (I) relates to a target governing artifact, and
  (II) establishes an association between the target governing artifact and the plurality of multi-attribute data tuples associated with the target governing artifact; and
a respective multi-attribute data tuple of the plurality of multi-attribute data tuples includes an item assemblies attribute field that is configured to store one or more assemblies of items associated with the respective multi-attribute data tuple.

4. The computer-implemented method according to claim 1, wherein performing the pairwise assessment between a respective physical component in the digital itemization and each multi-attribute data tuple of the governing digital artifact includes:
employing a heuristic comparison algorithm that evaluates semantic and syntactic data fields of the respective physical component against corresponding attributes in each multi-attribute data tuple of the governing digital artifact;
calculating a match score for each candidate pairing between the respective physical component and the plurality of multi-attribute data tuples associated with the governing digital artifact, wherein the match score computed for a candidate pairing between the respective physical component and a first multi-attribute data tuple is highest among all possible candidate pairings; and selecting the first multi-attribute data tuple as a likely match to the respective physical component.

5. The computer-implemented method according to claim 1, wherein:

the one or more assemblies of items are stored in an item assembly database, the item assembly database relates to a digital storage system designed to store a plurality of assemblies of items, and a respective assembly of items of the plurality of assemblies of items corresponds to a respective multi-attribute data tuple and defines a collection of inter-related items required for a real-world task associated with the respective multi-attribute data tuple.

6. The computer-implemented method according to claim 1, wherein generating the digital components acquisition request further includes:

(a) the identifying of the one or more assemblies of items based on the plurality of pairwise assessment matches, (b) obtaining the items and associated quantities defined in each of the one or more assemblies of items, (c) calculating a net quantity for each of the items obtained by (1) subtracting, from the net quantity for a respective item, negative item quantity values associated with the respective item across the one or more assemblies of items, and (2) adding, to the net quantity for the respective item, positive item quantity values associated with the respective item across the one or more assemblies of items, and (d) the programmatically installing, into the digital components acquisition request, of the items and the associated quantities, wherein programmatically installing the associated quantities includes installing the net quantity calculated for each of the items into the digital components acquisition request.

7. The computer-implemented method according to claim 1, wherein:

the plurality of pairwise assessment matches are associated with a plurality of assemblies of items, and identifying the one or more assemblies of items based on the plurality of pairwise assessment matches includes:

applying a plurality of computer-implemented item assembly rules to determine an inclusion or exclusion of each of the plurality of assemblies of items, and aggregating materials and requisite quantities delineated in one or more of the plurality of assemblies of items associated with the plurality of pairwise assessment matches based on an inclusion or exclusion outcome produced by the plurality of computer-implemented item assembly rules.

8. The computer-implemented method according to claim 1, wherein:

the digital components acquisition request relates to an application programming interface (API) request, and programmatically installing the items and associated quantities into the digital components acquisition request includes:

defining a target endpoint for the API request based on electronic communication preferences of the target external entity, and defining a payload of the API request based on the items and the associated quantities defined in the one or more assemblies of items, wherein defining the payload includes formatting the payload in accordance with the electronic communication preferences of the target external entity.

9. The computer-implemented method according to claim 1, wherein:

the digital components acquisition request relates to an electronic communication message, and programmatically installing the items and associated quantities into the digital components acquisition request includes:

instantiating a tabular data structure, adding a plurality of rows to the tabular data structure that correspond to the items and associated quantities delineated in the one or more assemblies of items, and embedding the tabular data structure in the digital components acquisition request.

10. The computer-implemented method according to claim 1, wherein:

the digital sourcing requisition is derived from a copy of an unstructured physical artifact, and obtaining the digital sourcing requisition includes:

receiving, via a graphical user interface, a copy of the unstructured physical artifact, extracting, via one or more optical character recognition (OCR) processes, a corpus of sourcing requisition feature data from the copy of the unstructured physical artifact, and installing the corpus of sourcing requisition feature data into a structured digital sourcing requisition data structure compatible with a system or service implementing the computer-implemented method.

11. The computer-implemented method according to claim 1, wherein obtaining the digital sourcing requisition includes:

downloading the digital sourcing requisition from an external software system via an application programming interface (API), normalizing data fields of the digital sourcing requisition downloaded from the external software system to conform to a standardized data format used by a system or service implementing the computer-implemented method, and generating a digital sourcing requisition data structure compatible with the system or service implementing the computer-implemented method based on the normalizing of the data fields.

12. The computer-implemented method according to claim 1, wherein:

the governing digital artifact record relates to a governing electronic artifact that defines operational attributes and parameters of the plurality of real-world tasks, a respective multi-attribute data tuple of the plurality of multi-attribute data tuples associated with the governing digital artifact record relates to a distinct real-world task of the plurality of real-world tasks, and a respective assembly of items of the one or more assemblies of items includes:

a list of items required for the distinct real-world task, and requisite quantities for each item of the list of items.

13. A computer-program product embodied in a non-transitory machine-readable storage medium storing computer instructions that, when executed by one or more computer processors, perform operations comprising:

obtaining, by a microservice, a digital sourcing requisition that includes a digital itemization of a plurality of physical components required for completing a plurality of real-world tasks;

in response to an input of the digital sourcing requisition, automatically extracting, by the microservice executing a token extraction algorithm, a plurality of search tokens from the digital sourcing requisition, the plurality of search tokens comprising a plurality of key-value attribute pairs;

using the plurality of key-value attribute pairs to automatically construct by the microservice, one or more digital search queries for identifying and retrieving from a target computer database a given governing artifact, wherein the microservice constructs each of the one or more digital search queries by including at least one of the plurality of key-value attribute pairs a given digital search query of the one or more digital search queries and search logic comprising Boolean logic or regular expression;

using the one or more digital search queries to automatically query, by the microservice, one or more data structures of a governing artifacts database that store an index of a plurality of governing artifacts;

retrieving, from the governing artifacts database, a governing digital artifact record based on the querying of the one or more data structures of the governing artifacts data;

assessing, by the one or more computer processors executing artifact matching computer instructions, the digital itemization of the plurality of physical components of the digital sourcing requisition against a plurality of multi-attribute data tuples associated with the governing digital artifact record, wherein assessing the digital itemization of the plurality of physical components includes:

(i) performing, by the one or more computer processors, a pairwise assessment between each physical component in the digital itemization and each of the plurality of multi-attribute data tuples associated with the governing digital artifact record, and (ii) when the pairwise assessment between a respective physical component of the plurality of physical components and a respective multi-attribute data tuple of the plurality of multi-attribute data tuples results in at least a semantic match, displaying the semantic match between the respective physical component and the respective multi-attribute data tuple in a graphical user interface for user verification and approval;

automatically generating, by the one or more computer processors, a digital components acquisition request based on a plurality of pairwise assessment matches produced during the assessing, wherein generating the digital components acquisition request includes:

(a) identifying, by the one or more computer processors, one or more assemblies of items based on a digital mapping of at least the plurality of multi-attribute data tuples of the plurality of pairwise assessment matches to a plurality of assemblies of items associated with the governing digital artifact, and (b) automatically generating, by the one or more processors, a structured digital components acquisition request by programmatically installing, by the one or more computer processors, into the structured digital components acquisition request, items and associated quantities defined in each of the one or more assemblies of items; and automatically transmitting, over a computer network, the digital components acquisition request to a target external entity for physically sourcing the items delineated in the digital components acquisition request.

14. The computer-program product according to claim 13, wherein:

the governing artifacts database includes a plurality of governing digital artifact records, and retrieving the governing digital artifact record from the governing artifacts database includes executing the artifact matching instructions that automatically match the digital sourcing requisition to a corresponding governing digital artifact record of the plurality of governing digital artifact records by:

identifying a job start date key-value attribute pair and a project code key-value attribute pair from the digital sourcing requisition, searching the governing artifacts database for one or more candidate governing digital artifact records that correspond to a value of the project code key-value attribute pair, and selecting one of the one or more candidate governing digital artifact records returned from the searching as the corresponding governing digital artifact record based on a value of the job start date key-value attribute pair.

15. The computer-program product according to claim 13, wherein performing the pairwise assessment between a respective physical component in the digital itemization and each multi-attribute data tuple of the governing digital artifact includes:

employing a heuristic comparison algorithm that evaluates semantic and syntactic data fields of the respective physical component against corresponding attributes in each multi-attribute data tuple of the governing digital artifact;

calculating a match score for each candidate pairing between the respective physical component and the plurality of multi-attribute data tuples associated with the governing digital artifact, wherein the match score computed for a candidate pairing between the respective physical component and a first multi-attribute data tuple is highest among all possible candidate pairings; and selecting the first multi-attribute data tuple as a likely match to the respective physical component.

16. The computer-program product according to claim 13, wherein generating the digital components acquisition request further includes:

(a) the identifying of the one or more assemblies of items based on the plurality of pairwise assessment matches, (b) obtaining the items and associated quantities defined in each of the one or more assemblies of items, (c) calculating a net quantity for each of the items obtained by (1) subtracting, from the net quantity for a respective item, negative item quantity values associated with the respective item across the one or more assemblies of items, and (2) adding, to the net quantity for the respective item, positive item quantity values associated with the respective item across the one or more assemblies of items, and (d) the programmatically installing, into the digital components acquisition request, of the items and the associated quantities, wherein programmatically installing the associated quantities includes installing the net quantity calculated for each of the items into the digital components acquisition request.

17. The computer-program product according to claim 13, wherein:
the plurality of pairwise assessment matches are associated with a plurality of assemblies of items, and
identifying the one or more assemblies of items based on the plurality of pairwise assessment matches includes:
applying a plurality of computer-implemented item assembly rules to determine an inclusion or exclusion of each of the plurality of assemblies of items, and
aggregating materials and requisite quantities delineated in one or more of the plurality of assemblies of items associated with the plurality of pairwise assessment matches based on an inclusion or exclusion outcome produced by the plurality of computer-implemented item assembly rules.

18. The computer-program product according to claim 13, wherein:
the digital sourcing requisition is derived from an unstructured physical artifact, and
obtaining the digital sourcing requisition includes:
receiving, via a graphical user interface, a user-uploaded copy of the unstructured physical artifact,
extracting, via one or more optical character recognition (OCR) processes, a corpus of sourcing requisition feature data from the user-uploaded copy of the unstructured physical artifact, and
installing the corpus of sourcing requisition feature data into a structured digital sourcing requisition data structure compatible with a system or service implementing the computer-program product.

19. The computer-program product according to claim 13, wherein obtaining the digital sourcing requisition includes:
downloading the digital sourcing requisition from an external software system via an application programming interface (API),
normalizing data fields of the digital sourcing requisition downloaded from the external software system to conform to a standardized data format used by a system or service implementing the computer-program product, and
generating a digital sourcing requisition data structure compatible with the system or service implementing the computer-program product based on the normalizing of the data fields.

20. A computer-implemented method comprising:
obtaining, by a microservice, a digital sourcing requisition that includes a digital itemization of a plurality of physical components required for completing a plurality of real-world tasks;
in response to an input of the digital sourcing requisition, automatically extracting, by the microservice executing a word embeddings model, a plurality of embeddings inferences from the digital sourcing requisition;
using the plurality of embeddings inferences to automatically construct by the microservice, one or more embeddings-based searches for searching an n-dimensional space comprising embedding vectors of a plurality of governing artifacts at distinct locations within the n-dimensional space, wherein the microservice constructs each of the one or more embeddings-based searches using at least one embedding inference of the plurality of embeddings inferences and by setting a embedding distance threshold;
using the one or more embeddings-based searches to automatically execute one or more searches, by the microservice, of the n-dimensional space;
identifying, by the microservice, one or more embedding vectors of the plurality of governing artifacts based on the one or more embedding vectors of the plurality of governing artifacts having a embedding distance value within or satisfy the embedding distance threshold, wherein identifying the one or more embedding vectors includes computing a given distance metric between each of the least one embedding inferences of the one or more embeddings inferences and each embeddings vector of the embedding vectors of the n-dimensional space;
using the identified one or more embeddings vectors of the plurality of governing artifacts to retrieve by the microservice the governing artifacts database, a governing digital artifact record;
assessing, by the one or more computer processors executing artifact matching computer instructions, the digital itemization of the plurality of physical components of the digital sourcing requisition against a plurality of multi-attribute data tuples associated with the governing digital artifact record, wherein assessing the digital itemization of the plurality of physical components includes:
(i) performing, by the one or more computer processors, a pairwise assessment between each physical component in the digital itemization and each of the plurality of multi-attribute data tuples associated with the governing digital artifact record, and
(ii) when the pairwise assessment between a respective physical component of the plurality of physical components and a respective multi-attribute data tuple of the plurality of multi-attribute data tuples results in at least a semantic match, displaying the semantic match between the respective physical component and the respective multi-attribute data tuple in a graphical user interface for user verification and approval;
automatically generating, by the one or more computer processors, a digital components acquisition request based on a plurality of pairwise assessment matches produced during the assessing, wherein generating the digital components acquisition request includes:
(a) identifying, by the one or more computer processors, one or more assemblies of items based on a digital mapping of at least the plurality of multi-attribute data tuples of the plurality of pairwise assessment matches to a plurality of assemblies of items associated with the governing digital artifact, and
(b) automatically generating, by the one or more processors, a structured digital components acquisition request by programmatically installing, by the one or more computer processors, into the structured digital components acquisition request, items and associated quantities defined in each of the one or more assemblies of items; and automatically transmitting, over a computer network, the digital components acquisition request to a target external entity for physically sourcing the items delineated in the digital components acquisition request.

* * * * *